Dec. 20, 1927.

G. SUNDBACK 1,653,320

MAKING FASTENER STRINGERS

Filed April 30. 1924     17 Sheets-Sheet 1

INVENTOR
Gideon Sundback
BY
ATTORNEY

Dec. 20, 1927.   1,653,320

G. SUNDBACK

MAKING FASTENER STRINGERS

Filed April 30. 1924   17 Sheets-Sheet 3

INVENTOR
Gideon Sundback
BY
ATTORNEY

Dec. 20, 1927. 1,653,320
G. SUNDBACK
MAKING FASTENER STRINGERS
Filed April 30, 1924 17 Sheets-Sheet 4
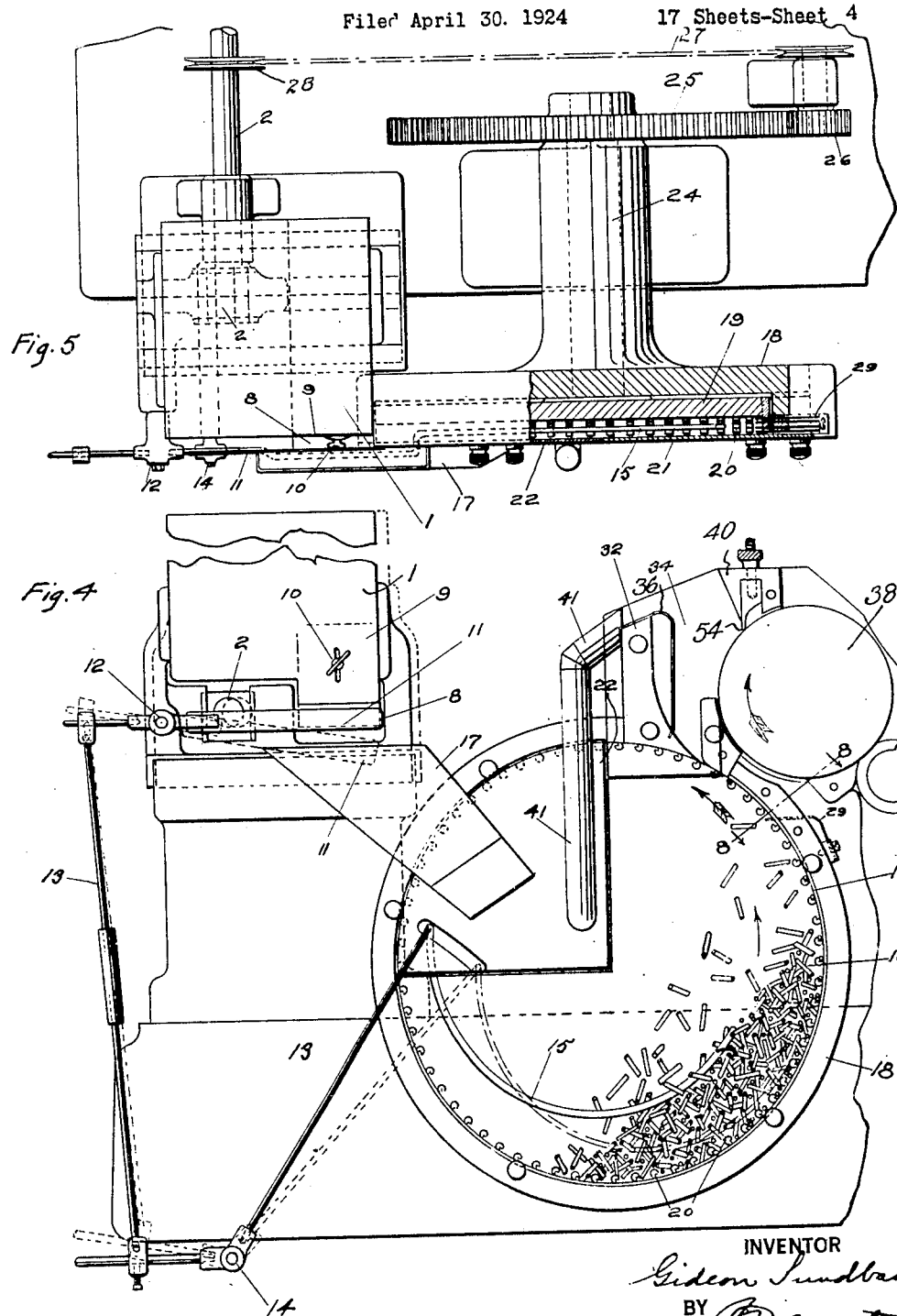
INVENTOR
ATTORNEY

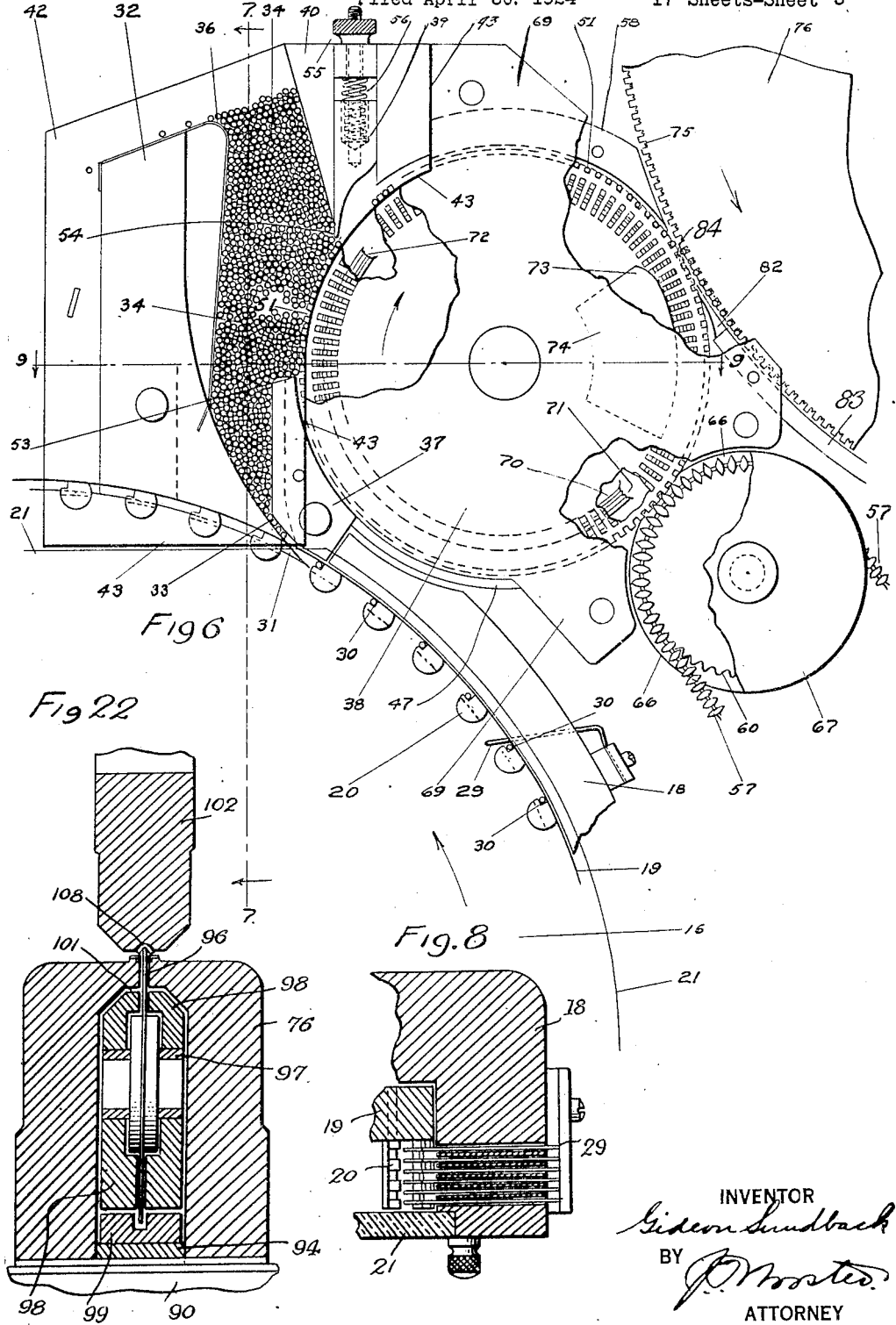

Dec. 20, 1927.
G. SUNDBACK
MAKING FASTENER STRINGERS
1,653,320
Filed April 30. 1924     17 Sheets-Sheet 6
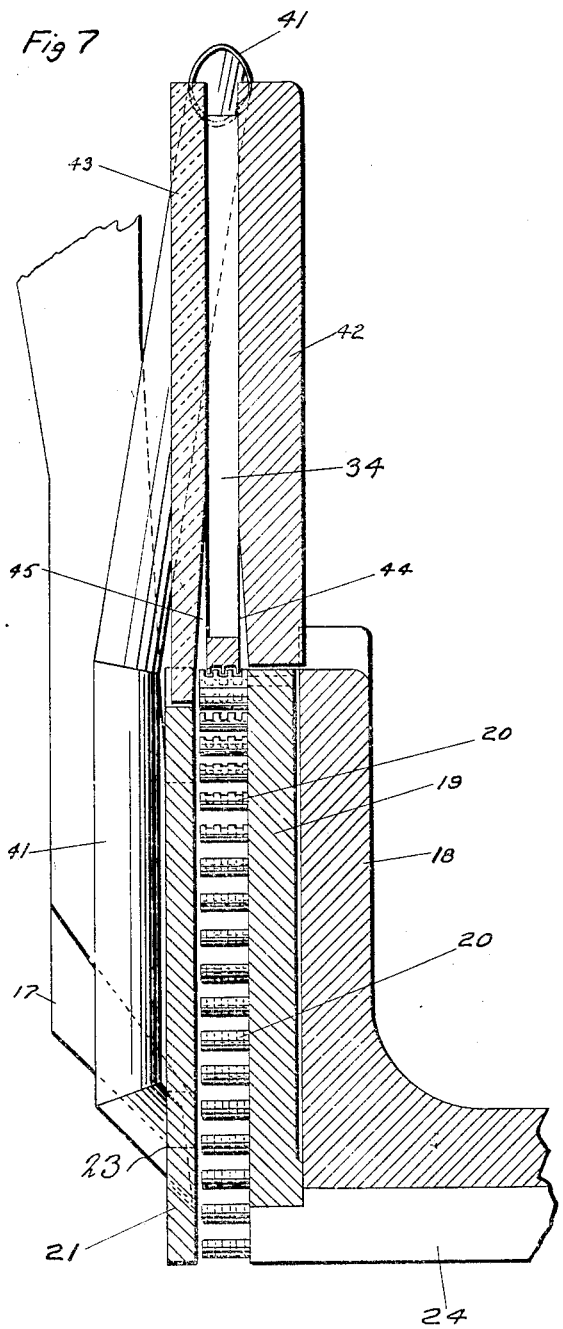
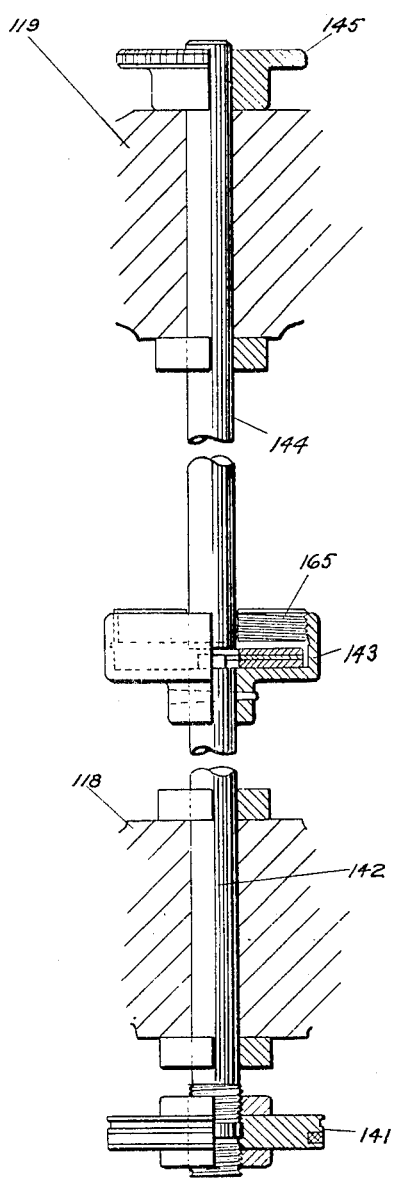
INVENTOR
Gideon Sundback
BY
ATTORNEY

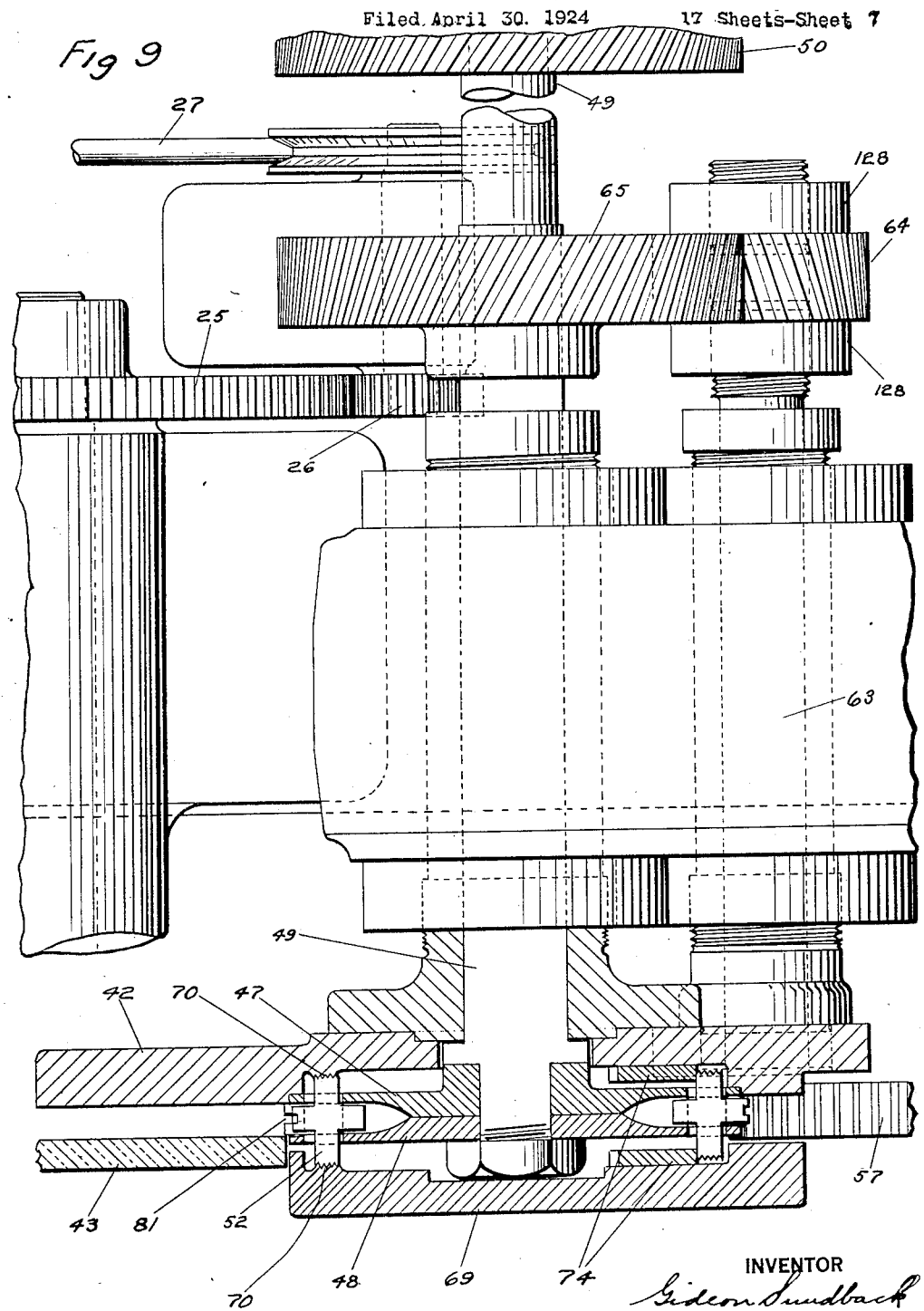

Dec. 20, 1927.　　　　　　　　　　　　　　　　　1,653,320
G. SUNDBACK
MAKING FASTENER STRINGERS
Filed April 30, 1924　　　17 Sheets-Sheet 8

INVENTOR
Gideon Sundback
BY
ATTORNEY

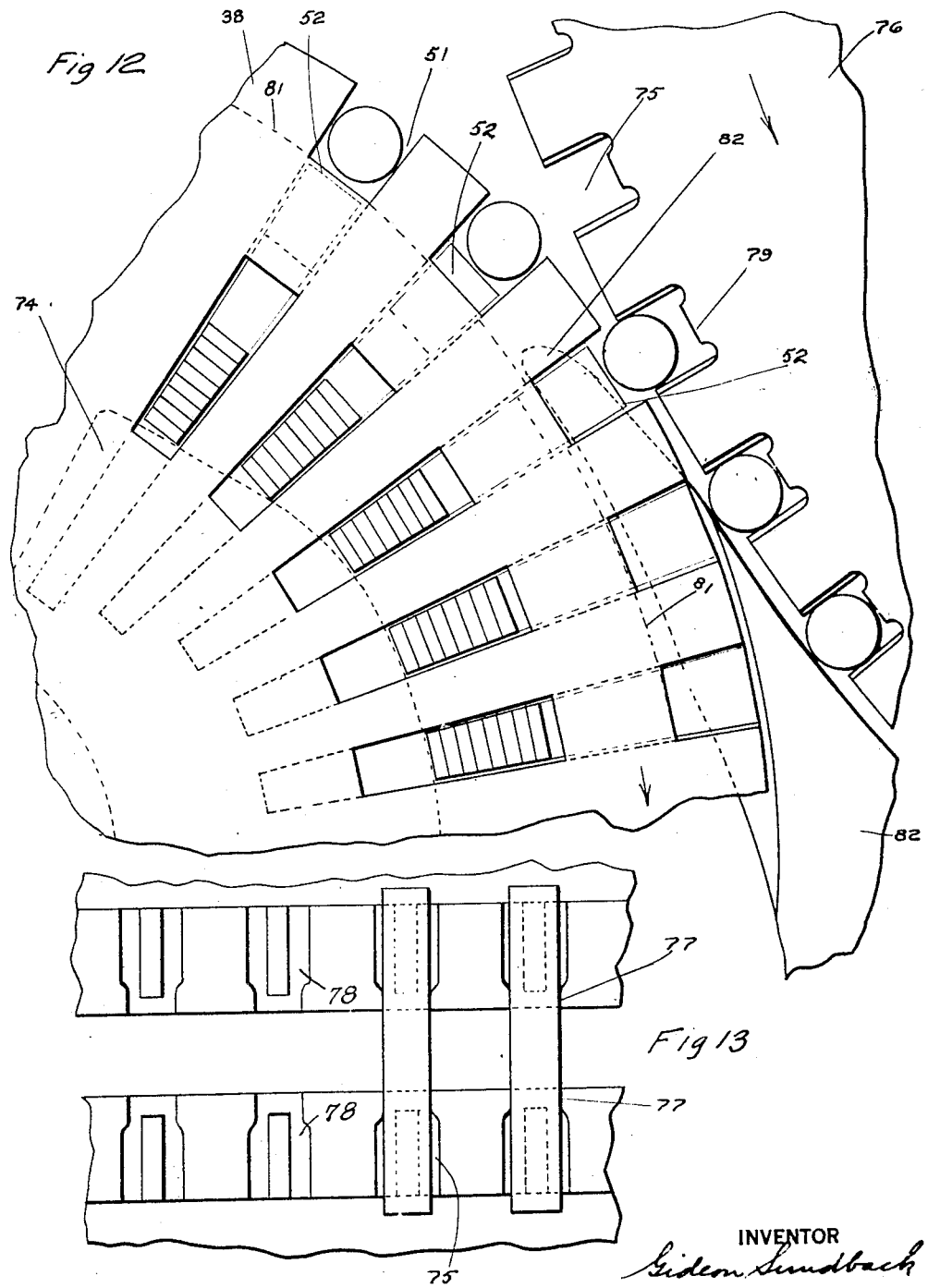

Dec. 20, 1927.　　　　　G. SUNDBACK　　　　　1,653,320
MAKING FASTENER STRINGERS
Filed April 30. 1924　　17 Sheets-Sheet 10
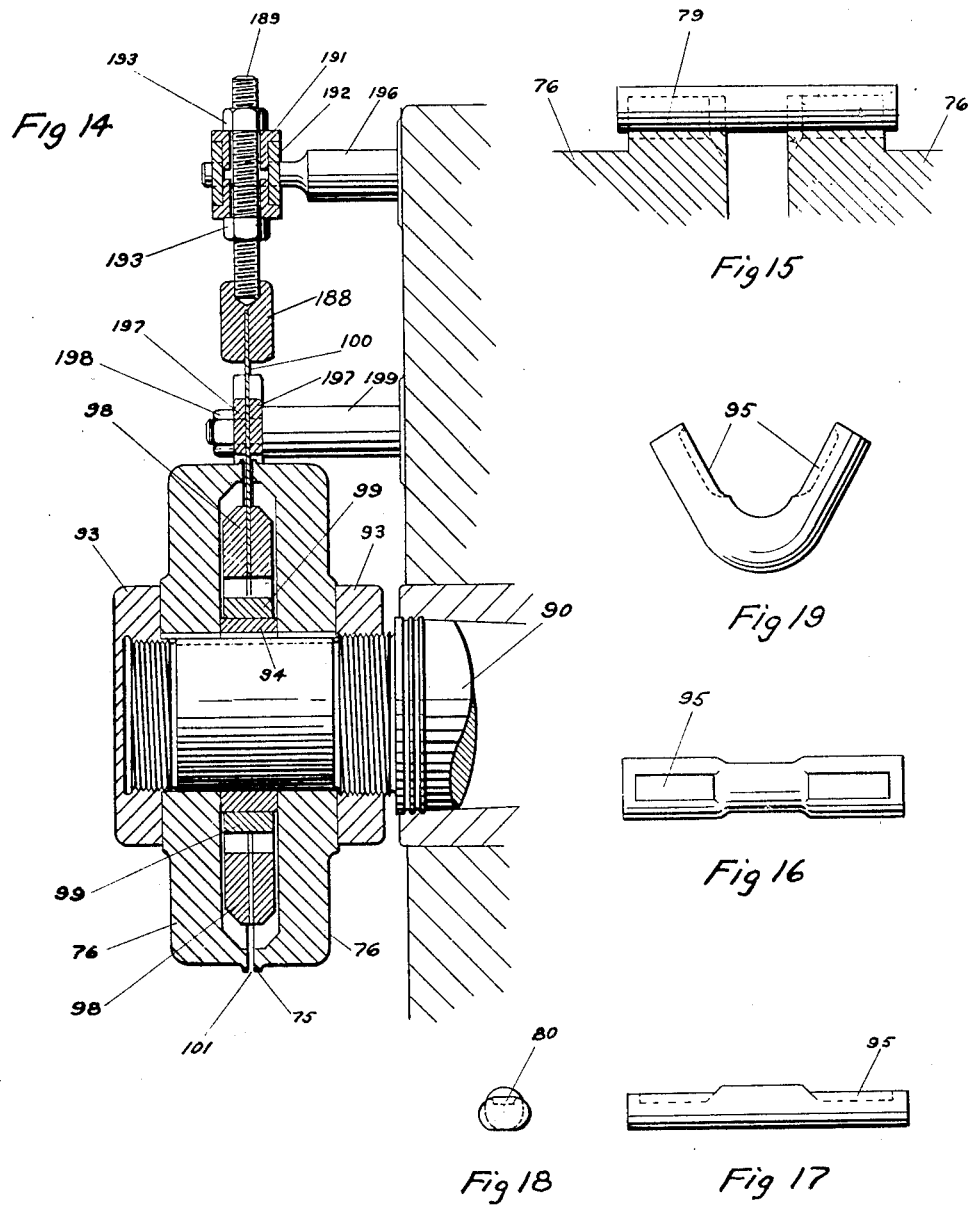

Dec. 20, 1927.　　　　　　　　　　　　　　　　　　1,653,320
G. SUNDBACK
MAKING FASTENER STRINGERS
Filed April 30. 1924　　　17 Sheets-Sheet 11
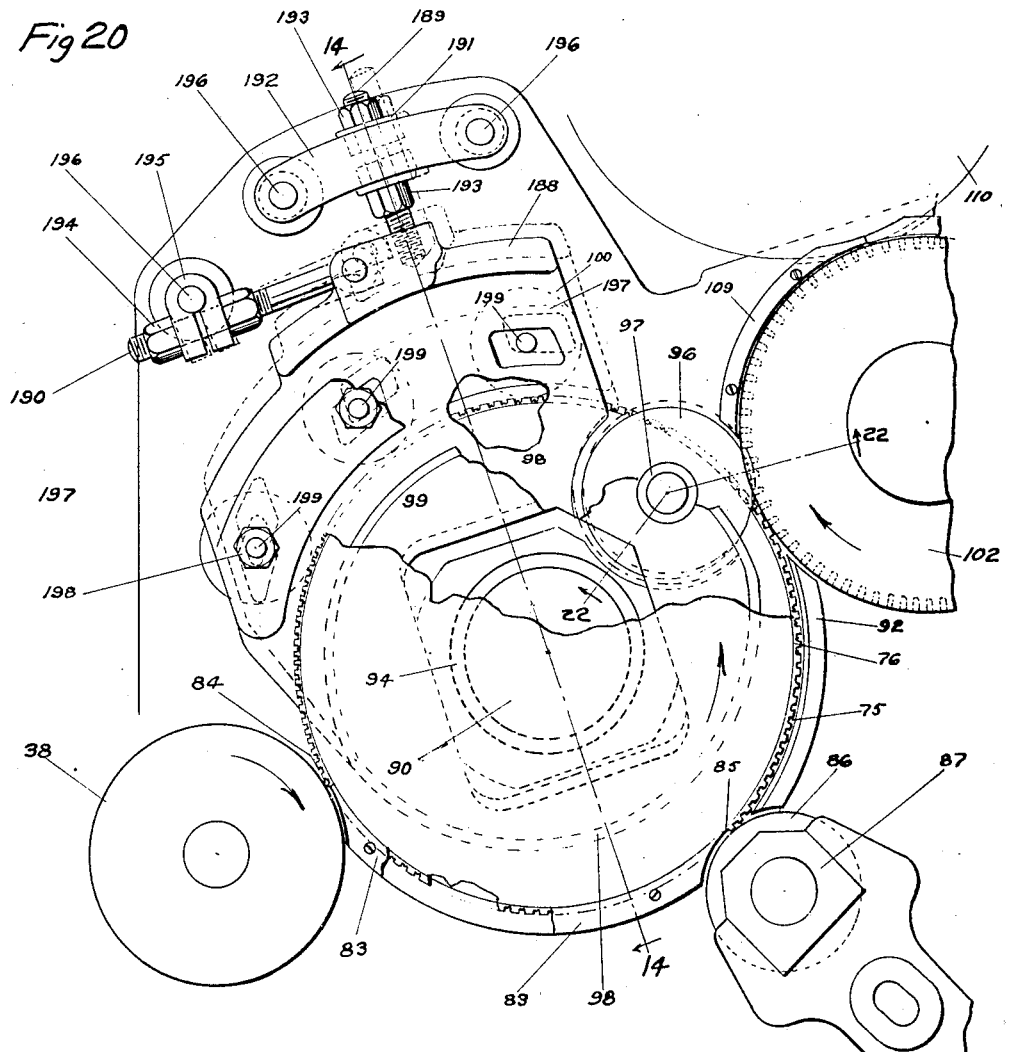
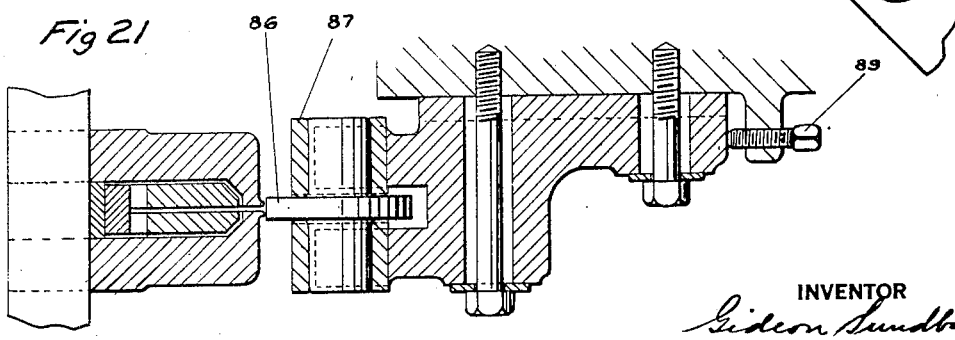
INVENTOR
Gideon Sundback
BY
ATTORNEY Dec. 20, 1927.
G. SUNDBACK
1,653,320
MAKING FASTENER STRINGERS
Filed April 30. 1924      17 Sheets-Sheet 12
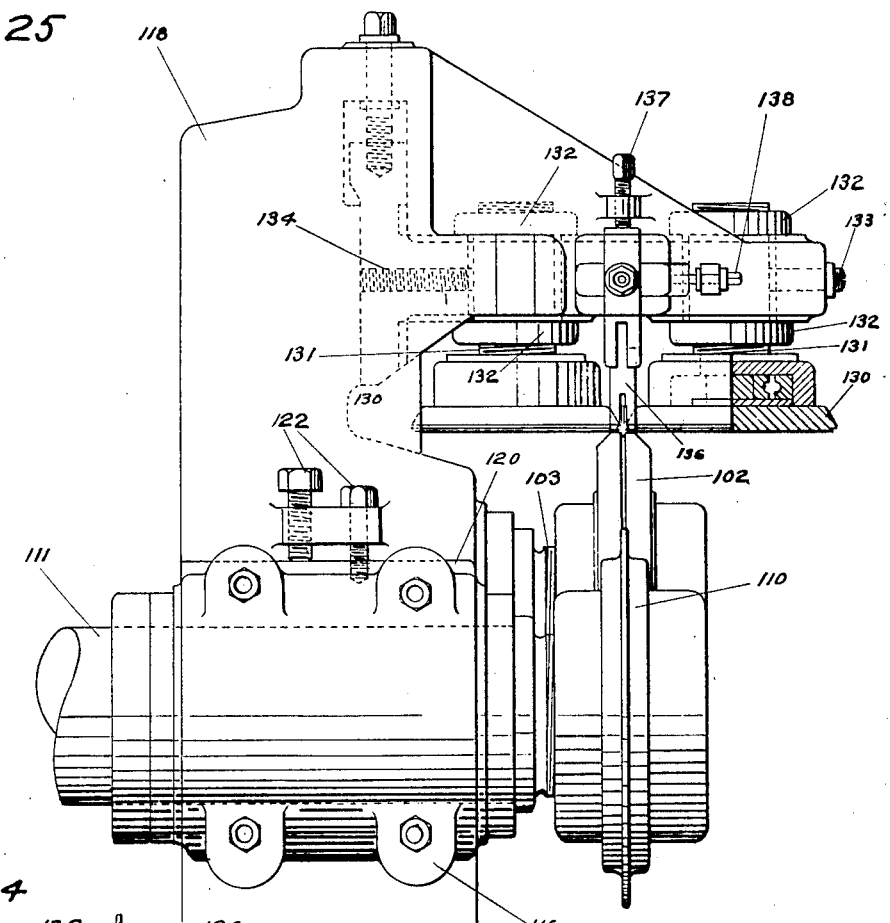
Fig 25
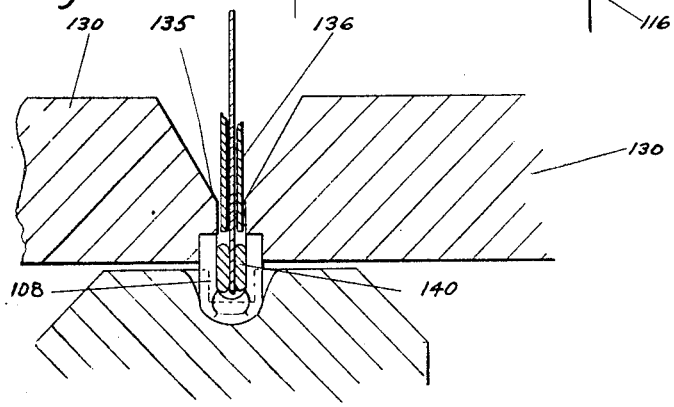
Fig 34
INVENTOR
Gideon Sundback
BY
ATTORNEY

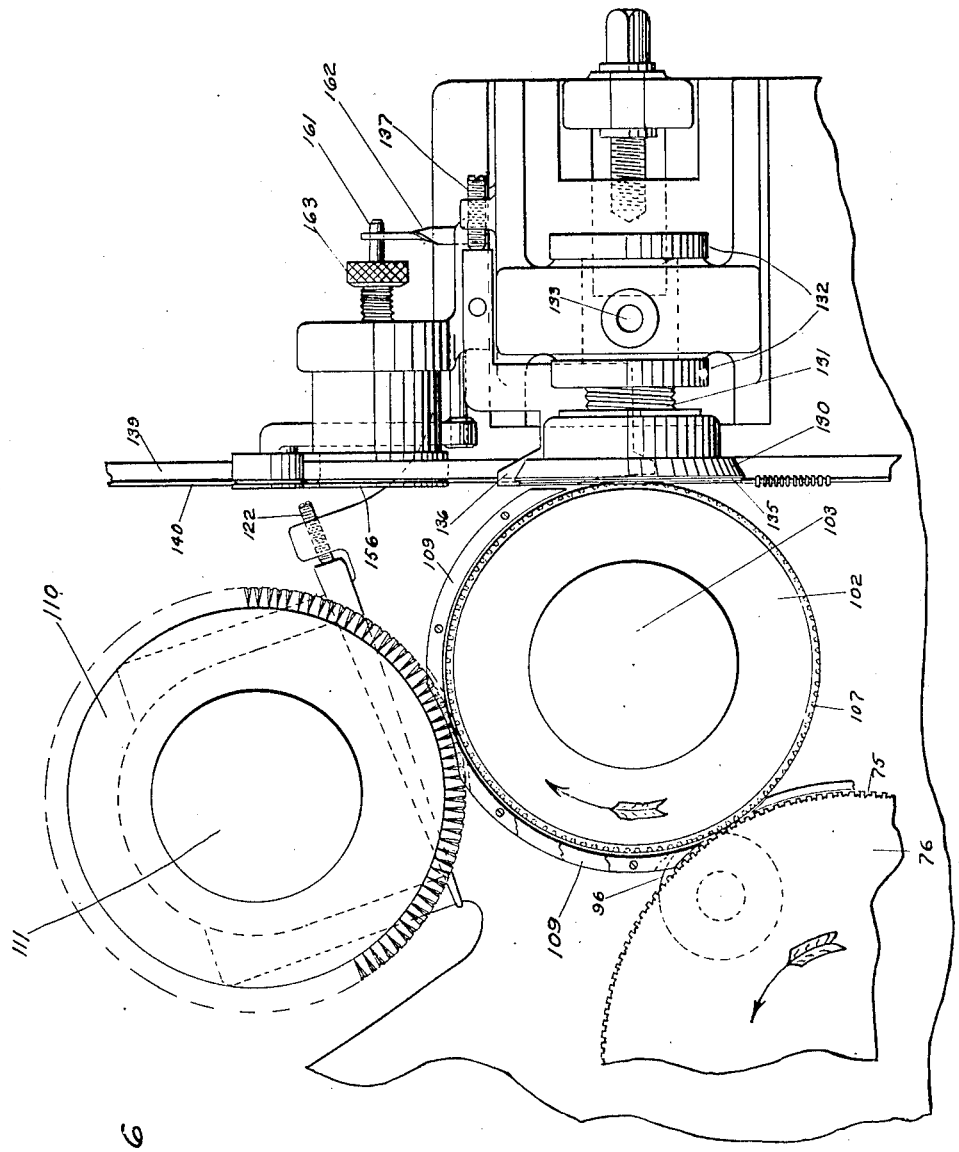

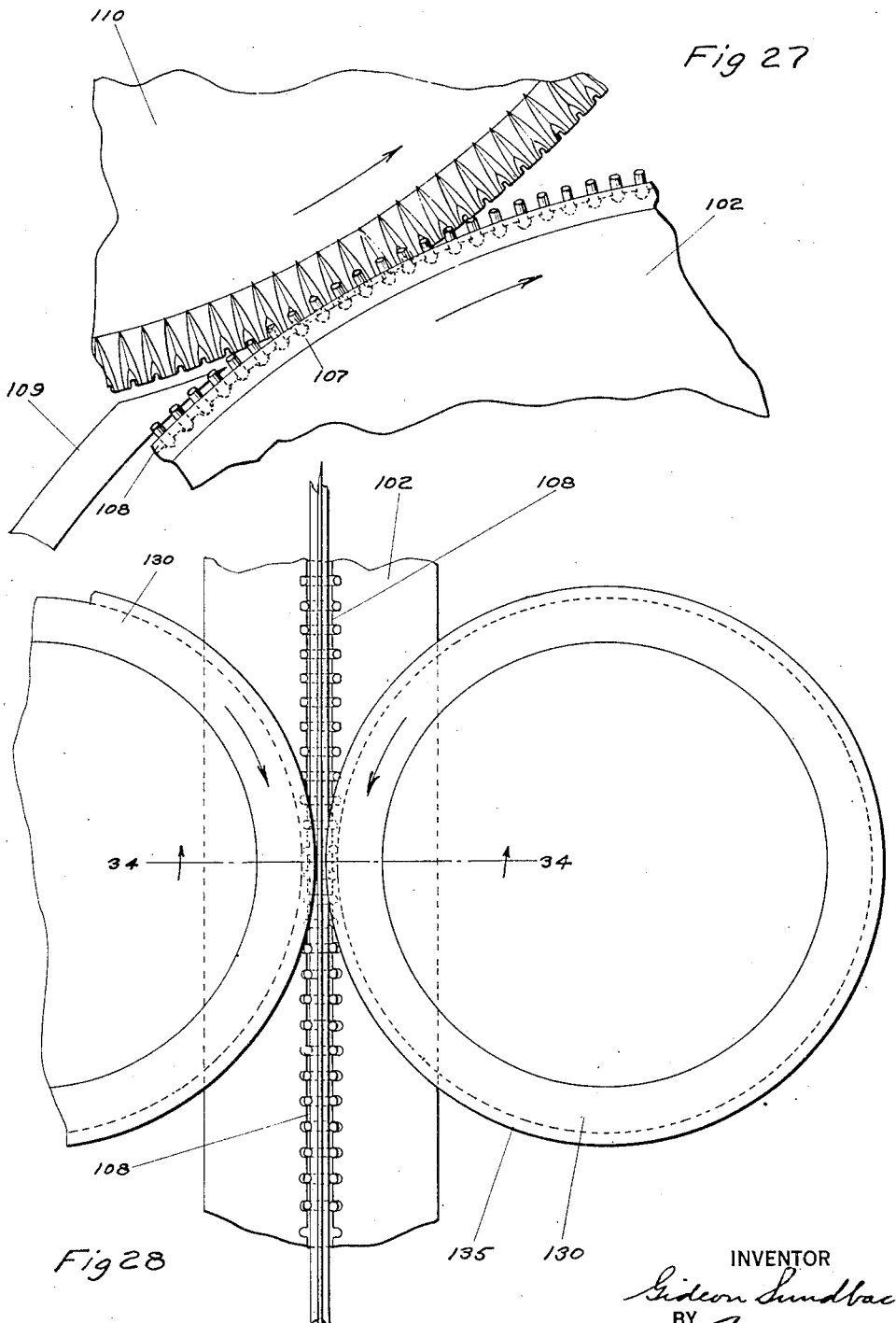

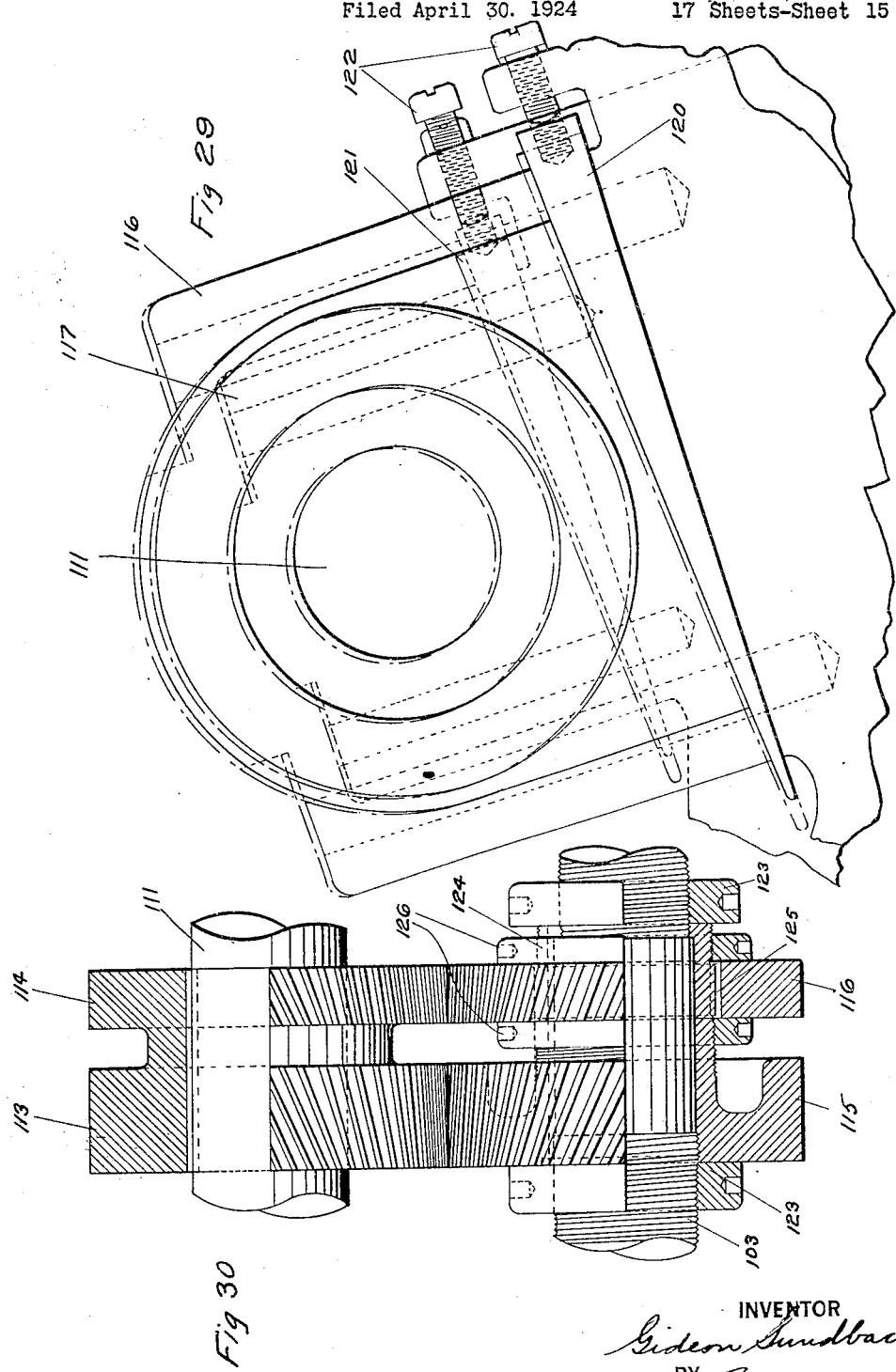

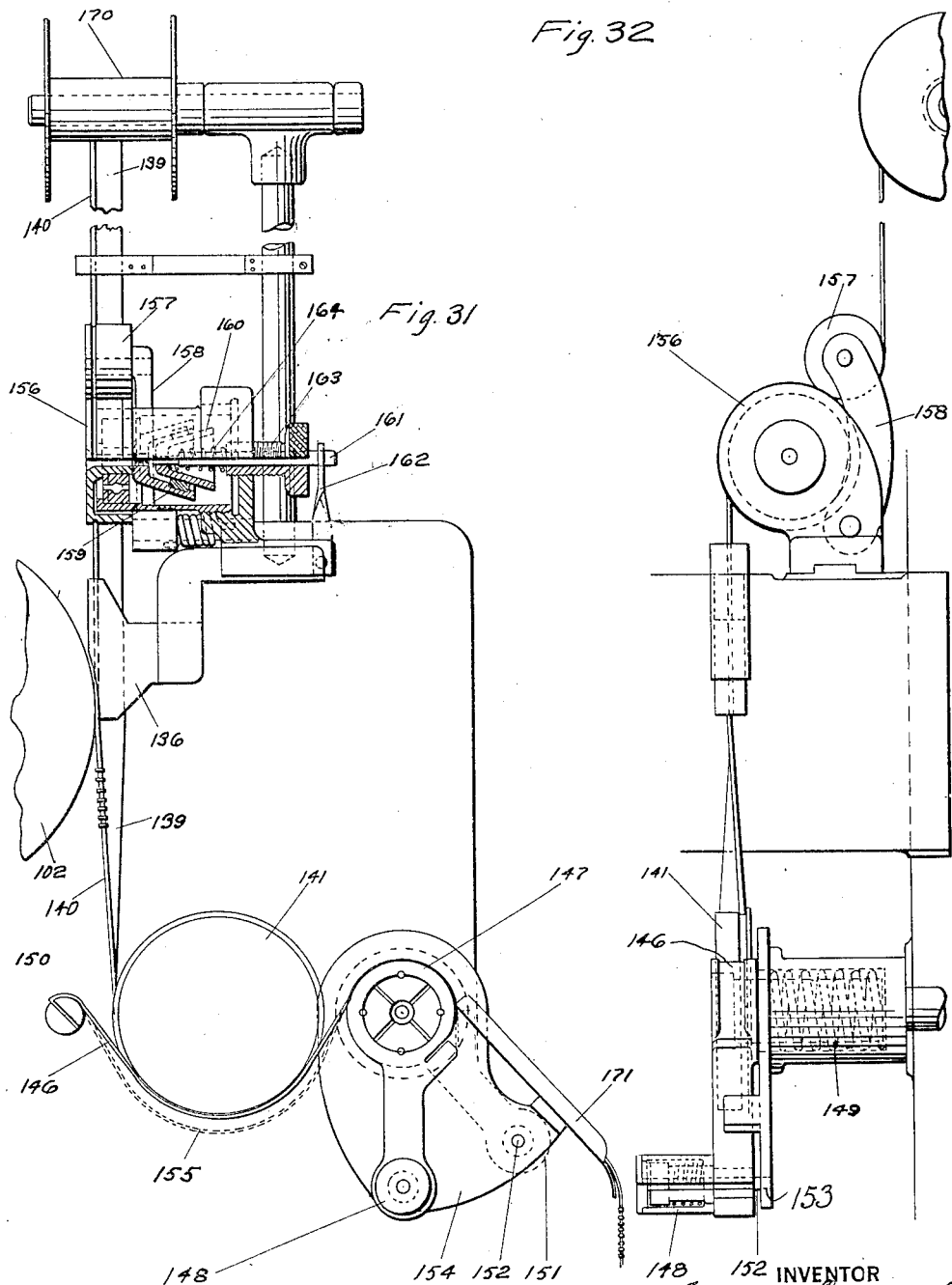

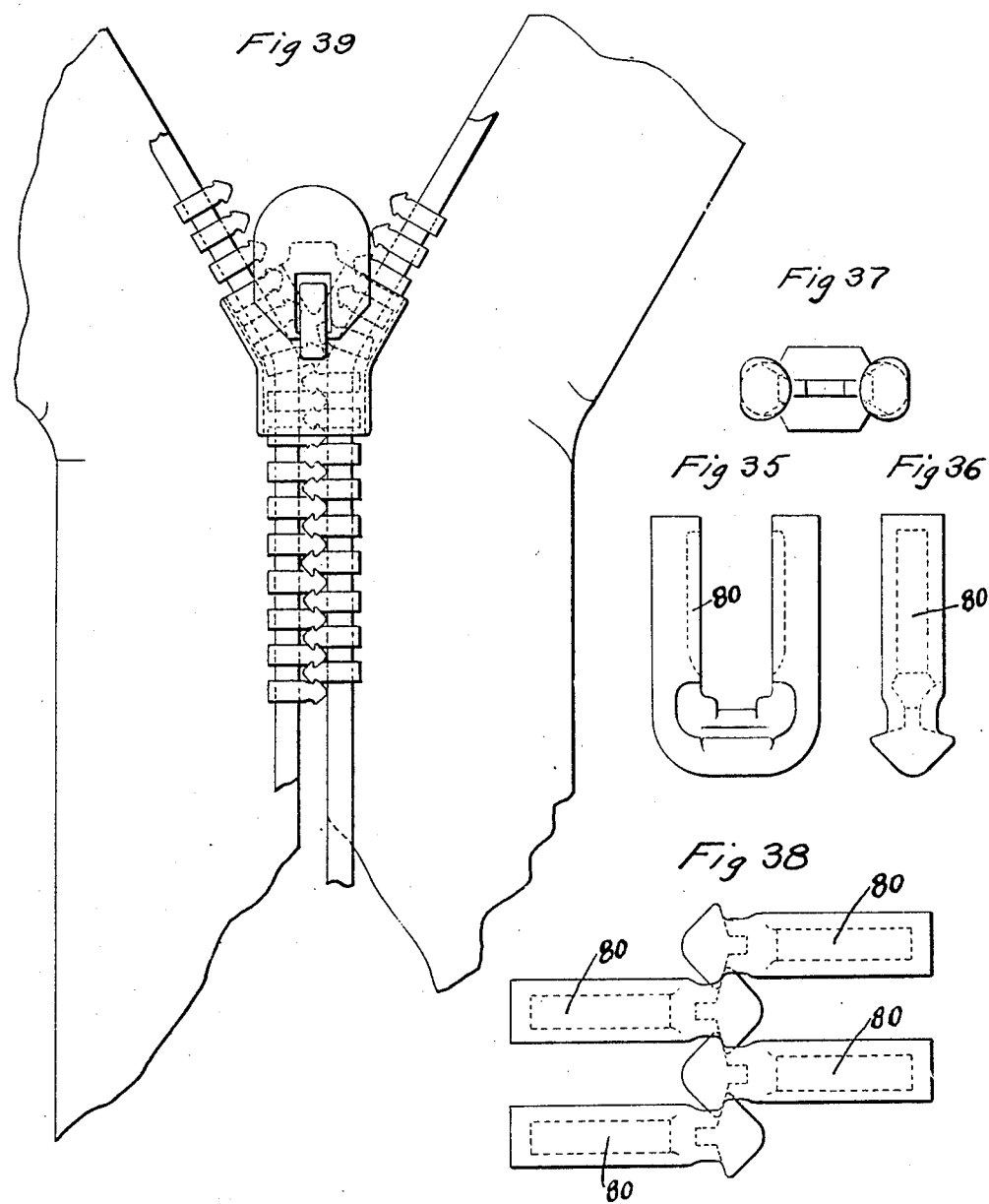

Patented Dec. 20, 1927.

1,653,320

UNITED STATES PATENT OFFICE.

GIDEON SUNDBACK, OF MEADVILLE, PENNSYLVANIA, ASSIGNOR TO HOOKLESS FASTENER COMPANY, OF MEADVILLE, PENNSYLVANIA, A CORPORATION OF PENNSYLVANIA.

MAKING FASTENER STRINGERS.

Application filed April 30, 1924. Serial No. 710,047.

This invention relates to a method and machine for making fastener stringers from cut wire blanks by rolling operations and has for its object to reduce the cost of production, and to increase the output of stringer machines heretofore invented by me, as shown in previous U. S. Patents #1,331,884, of Feb. 24, 1920, and #1,467,015, of September 4, 1923. Said machines have been used in producing the fastener stringers shown in my U. S. Patent #1,219,881, of March 20, 1917, and have produced many millions thereof, with the demand for such fasteners constantly increasing.

At present these fasteners are applied to various kinds of bags, such as money, golf, hand, laundry, hat and bathing suit bags; roll-up and instrument cases; tobacco pouches; clothing such as overalls, brassières, arctics, trousers, etc., and additional applications are constantly being made. Extension of the use of the slider actuated interlocking type of fastener to other fields where enormous footage at low cost may be required, such as closures for tarpaulins, tents, automobile and boat curtains, etc., has heretofore been hampered by high production cost, although sufficient has been done in these fields to indicate that an effective fastener produced at low cost would enjoy a very large market.

In the machine disclosed in my U. S. Patent #1,331,884, fastener member blanks are died out of a rolled flat alloy wire, formed with interlocking surfaces, and set in groups in spaced relation on the stringer.

In the machine disclosed in my U. S. Patent #1,467,015, the waste involved in the use of a flat blank wire is avoided by providing a blank alloy wire rolled to special Y section, and transversely cutting off blank members which are died to form, and set in groups in spaced relation on the stringers.

Both said machines include many reciprocating parts such as dies, punches and setting tools, and are relatively slow in output because thereof. The product is relatively expensive both because of preliminary rolling and annealing operations on the wire, and because of finishing operations on the stringers such as wire brushing, etc., to remove burs, and rolling to gauge. For a given holding power there may be an excess of metal in the stringers, which is expensive and renders the fastener objectionably heavy for many uses where lightness is desirable, as in garments. The use of light alloys in the previous machines does not solve this problem because such alloys are expensive, and require special and careful handling in order to be worked by deforming tools and dies as disclosed in said patents. A further element in production by the above machines which it is desired to reduce as far as possible is heavy cost of providing, replacing, and maintaining tools and spares, since shutting down a machine to change a tool requires an expensive tool maker or machinist, and loss of production, besides considerable investment in new and spare tools.

In order to reduce present wire rolling, blank forming and finishing, material, and tool costs, I have devised the novel method, machine, and interlocking jaw member herein disclosed, whereby the footage output per day of one automatic machine is increased about ten times, with an accompanying reduction in over-all cost of stringer production of over 50%. This is accomplished broadly by using previously cut blanks, and feeding, bending, forming and setting them on the stringer tape by mechanism wherein the blanks are continuously moving while being worked on. Such mechanism can run much faster and more smoothly than any reciprocating or intermittent mechanism heretofore employed, and will produce finished stringers within permissible tolerance without the expensive final bur removing and other finishing operations heretofore required.

The particular sequence of forming operations can be varied widely within the broad scope of the invention, as will hereinafter appear. According to the preferred form of this invention, plain wire of predetermined gauge is cut into blanks of uniform length which are then tumbled to remove burs and sharp edges. The tumbled blanks are put in a hopper; thence arranged parallel in a magazine; then fed to rotary multiple dies to be formed; thence into engagement with the corded tape; and finally set on the tape by rolls, without subsequent finishing operations. The separate rolling operations comprised in forming are herein shown as flattening or indenting the blank ends to increase the grip on the corded tape edge, bending to U shape, and compressing the bend to the desired cross section of interlocking members.

Commercial production requires the stringers to have spaced groups of members, with uniform spacing between the members of each group, which grouping and spacing is effected in my previous machines by control of the tape feed. Such method is undesirable in this invention because of the high speed of the rotary feeding, forming and setting mechanisms, although as will be explained hereafter, a variable tape feed can be used herein for variation of both the individual and group spacing. The large capacity of this machine is in the main favored by controlling both the group and individual spacing independently of the tape feed, thereby enabling the latter to be less intermittent and independently controllable. Since the rotary dies act as carriers of the parallel disposed cut blanks, individual spacing is primarily determined by the peripheral distance between the die recesses which can be varied within limits by varying the tape feed, while group spacing is primarily determined by periodically omitting to charge a succession of recesses in the first feeding member with cut blanks. At the same time, high speed and continuity in each group requires that every recess for a group be charged with a blank, as otherwise missing members of a group have to be put on by hand. After piling the blanks in parallel relation in a magazine, a rotary recessed distributor takes them one by one therefrom except where group spaces are to come in the stringers. To prevent each distributor recess taking a blank from the magazine, predetermined recesses are automatically blocked under control of a pattern device, here shown as a belt, corresponding to the desired group spacing on the stringers. By changing the belt for different groups of like individual spacing, stringers of desired group length can be obtained.

On account of the very high speed of this machine, which necessitates provision of a very large number of blanks, a special mechanism is necessary to stack the blanks parallel in the magazine and to control the supply according to the consumption of the machine.

The invention also comprises several broad combinations of means; various novel adjustments desirable for maintaining the proper angular relation between the several rotary forming devices and other parts of the machine; tape control; and numerous details of construction; all of which will be more fully understood in connection with the description of the accompanying drawings, wherein—

Figure 11:
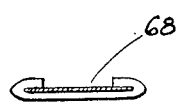
Figure 10:
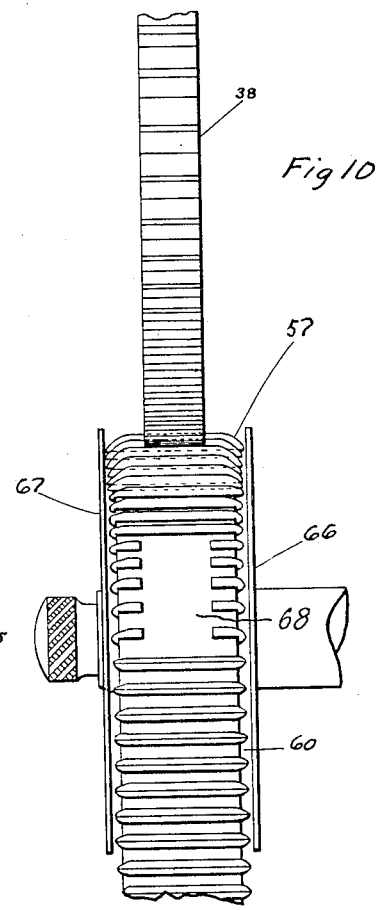

Fig. 4 is an elevation on an enlarged scale of the blank hopper, conveyor and magazine, Fig. 5 is a top view of Fig. 4, Fig. 6 is an elevation on an enlarged scale of the magazine, distributor, group spacing control device, and a portion of the first forming die, Fig. 7 is a section of the magazine on the line 7—7 of Fig. 6, with the blanks omitted from the magazine in order to simplify the showing, Fig. 8 is a section of the conveyor on the line 8—8 of Fig. 4, Fig. 9 is a plan view partly in section on line 9—9 of Fig. 6, Fig. 10 is a detail view showing the group control belt, Fig. 11 shows details of Fig. 10, Fig. 12 is an enlarged detail view showing the distributor bringing blanks to the first forming die and the latter carrying on, Fig. 13 is a plan view of Fig. 12, Fig. 14 is a section on the line 14—14 of Fig. 20, Fig. 15 is a detail view showing the blank being carried by the first forming die ready to be impressed with the tape holding projections, Figs. 16, 17 and 18 are detail views of the blank after the first pressing operation, Fig. 19 is a view of the pressed blank after being bent, Fig. 20 is an elevation showing the first and second forming dies and the bender.

Figure 3:
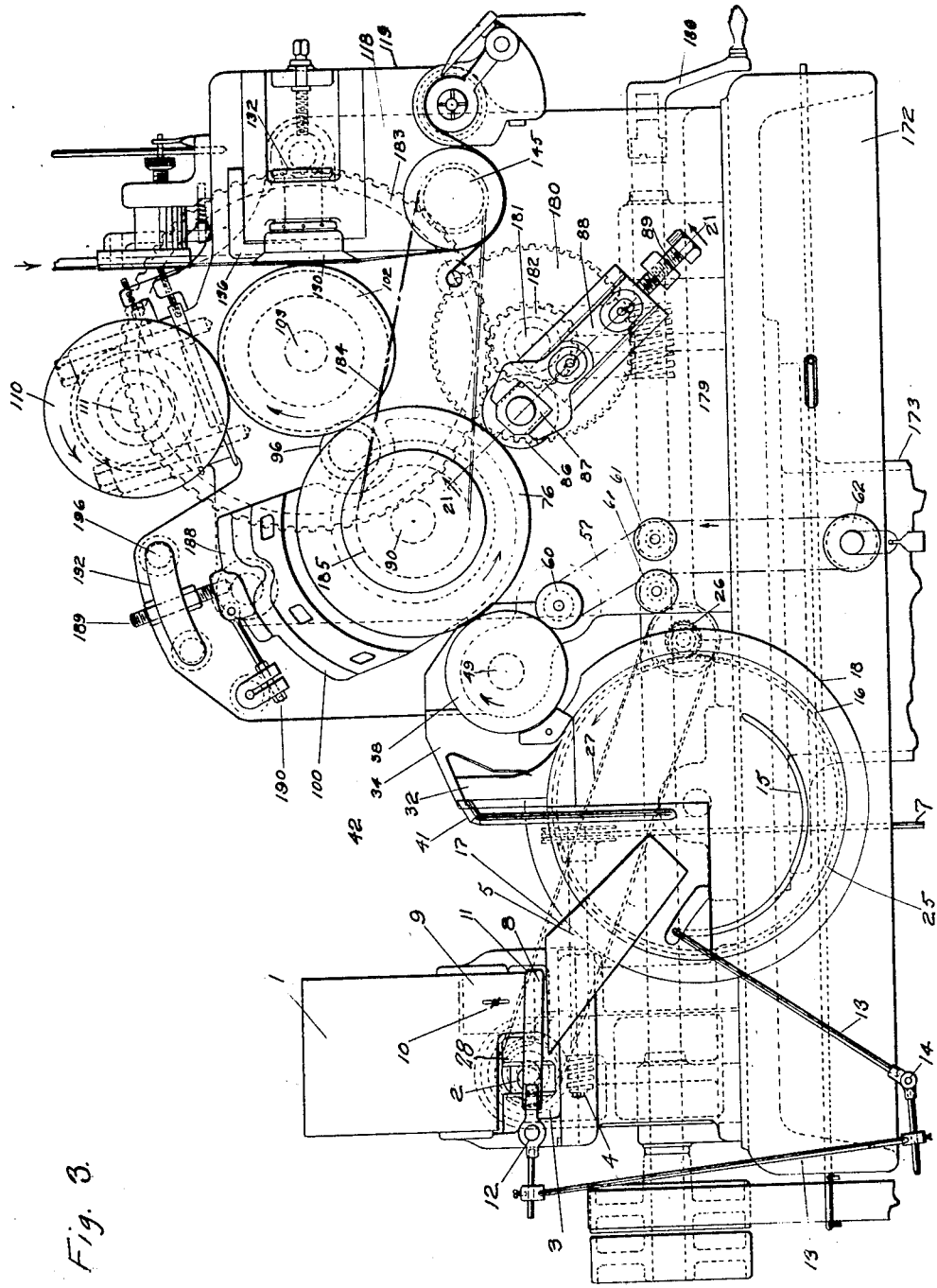
Fig. 3 is a front elevation seen from the bottom of Fig. 1.
Figure 23:
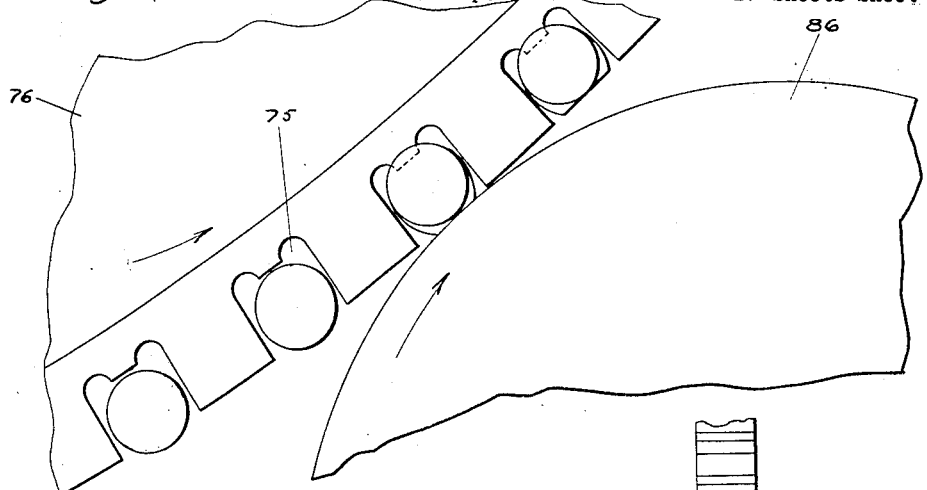
Figure 24:
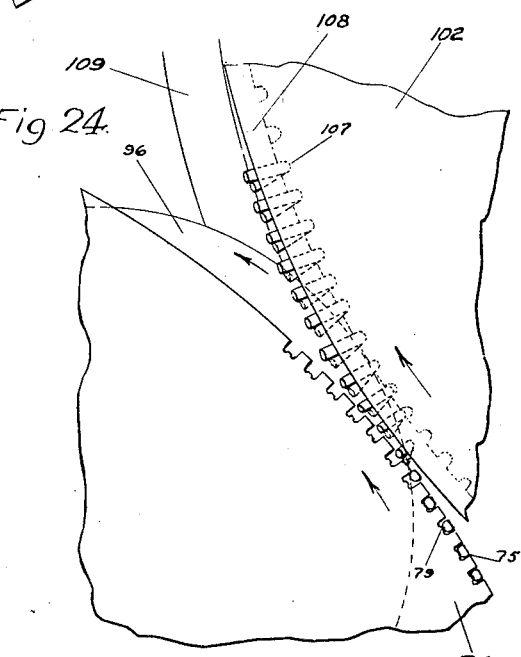

Fig. 21 is a section on the line 21—21 of Fig. 3,

Fig. 22 is a section on the line 22—22 of Fig. 20,

Fig. 23 is a detail of the first forming die showing the blank ends being rolled to form tape engaging surfaces, Fig. 24 is a detail view showing the blank being transferred from the first forming die to the second die, Fig. 25 is a detail plan view showing the punch, second forming die and transfer of formed jaw members to the tape, Fig. 26 is a detail elevation of the same, Fig. 27 is a detail view on an enlarged scale showing forming of interlocking surfaces on the U-shaped blanks during travel in the die, Fig. 28 is a detail view showing the continuous setting of the formed members on the tape as delivered by the die, Fig. 29 is a detail view showing the adjustment of the punch, Fig. 30 is a detail view showing the angular adjustment of the rotary dies, Fig. 31 is an elevation showing the tape feed;

Fig. 32 is an end view seen from the right of Fig. 31,

Fig. 33 is a detail plan view partly in section of the tape feeding mechanism,

Fig. 34 is a section on the line 34—34 of Fig. 28,

Figs. 35, 36, 37 are detail views of a form of completed interlocking member, by way of example, Fig. 38 is a detail view showing the cooperation of these members, and Fig. 39 is an enlarged view of a completed fastener.

The blanks used in carrying out this invention are preferably cut from round alloy wire of desired material, such alloy wire being of nickel silver, duralumin or other light, non-rusting alloy, or such other metal as may be desired, the only requirement being that it be capable of responding to the relatively simple rolling operations herein required. The term wire as used in this specification is intended to cover any elongated blank of desired cross section and not merely a small section of round drawn wire. An important advantage of this invention resides in the elimination of special cross section of blank, but the invention will be described with reference to blanks made from drawn round wire. The wire as received from the mill is first cut into elongated pieces of the desired length, special care in cutting being taken to keep the ends straight with a minimum of flattening or burring. As one machine may use upwards of 400,000 pieces per day, sufficient cutting capacity must be provided to supply the machine. The next step is to tumble these cut blanks or wires in ordinary tumbling barrels until smoothed and the cut ends slightly rounded, whereupon the blanks are ready to be supplied to the machine.

The blanks as received from the tumbling barrel are dumped into a hopper 1, Figs. 1, 3, 4 and 5, which is oscillated by crank shaft 2 driven by worm gear 3, worm 4 on shaft 5 from motor 6 through belt 7. 8 is a discharge trough receiving the blanks through gate 9 adjustable by set screw 10. The opening under adjustable gate 9 is closed by a vibrating gate 11 adjacent trough 8 pivoted on stud 12 and connected to rod 13 pivoted on stud 14 having bent end 15 within the conveyor 16, Figs. 4 and 5. The trough 8 discharges into the rotary conveyor 16, in which is contained the floating end 15 of rod 13. As the blanks pile up in the bottom of the conveyor 16 the rod 15 acts to close the gate 11 to restrict the supply from the hopper to the conveyor, and vice versa. The vibrating gate 11 is thus controlled between the upper position shown in Figs. 3 and 4 and the lower dotted position shown in Fig. 4 by floating rod 15. Thus, when the gate 11 is lowered, the blanks will fall over its upper edge from trough 8 through chute 17 into conveyor 16. The vibrating gate 11 controlled by the depth of blanks in the bottom of conveyor 16 thus controls the feed of blanks to the conveyor. By adjusting gate 9 the maximum amount of blanks in the conveyor is determined.

The conveyor 16 comprises a stationary cylindrical casing 18 and a rotary disk 19 carrying slotted carrying pins 20, Figs. 4, 5, 7. The outer end of the casing 18 is enclosed by a glass sector 21, Figs. 5, 7, and plate 22. The chute 17 is carried by plate 22 and the blanks in chute 17 enter the conveyor through a hole 23 in plate 22. The disk 19 is mounted on shaft 24 and driven in the direction of the arrow, Fig. 4, by gear 25 through pinion 26, belt 27 and pulley 28 on shaft 2, Figs. 3 and 5.

As the disk 19 revolves, each carrier pin 20 tends to pick up a blank in positions as illustrated in Fig. 6, it being seen that these pins 20 are longitudinally notched as at 30 of a depth to only carry one blank. Also, as these carrier pins move upwardly, other blanks will either fall off or be knocked off by resilient snap springs 29 mounted on casing 18 and projecting into the path of the carrier pins 20. See Figs. 4, 5 and 8. These springs are lifted by one pin and then snapped down on the succeeding pin. The slots in the casing 18 through which the springs 29 extend are formed of laminated metal plates proportioned so that the springs 29 are smaller in diameter than the blanks, and the spacings between the springs are also less than the diameter of the blanks. In this way, blanks cannot be caught in the slots containing springs 29 nor can a blank in vertical position on a pin 20 be missed by one or the other of springs 29 since the spacing between the springs is smaller than the diameter of the blanks. In this way only one blank is carried by each pin, and practically every pin will carry a blank, while the blanks carried are thus lined up parallel and practically in end alignment.

From the conveyor pins 20 the blanks are stripped by strippers 31 on block 32 and pass upwardly in parallel contacting relation into the magazine, see Fig. 6. The strippers 31 resemble prongs of a fork and, as will be seen in Fig. 6, pass through the transverse slots in pins 20. The pins 20 are so closely spaced relatively to the slope of strippers 31 and channel 33 that a blank which has been stripped from pin 20 cannot fall back into the conveyor. Continued motion of the disk 19 and the pins 20 thus forces the blanks into the magazine space 34 and piles them up therein in parallel. With the magazine empty and the conveyor running at high speed the blanks are thrown quite forcibly up into the magazine, but as soon as the space 34 fills up, the weight of the blanks holds incoming ones down and permits the conveyor to be run at very high speed without disturbing the smooth passage of the blanks through channel 33 into the machine.

The magazine 34 is confined on one side by spring 36 and block 32, and on the opposite side by block 37 at the bottom, and at the top by the rotary distributor 38, spring plunger 39, and block 40. The top of the magazine is open and when it is filled the surplus blanks roll backward over the upper edge of spring 36 down through overflow chute 41 into the conveyor. See Figs. 4, 6 and 7. The blanks are held lengthwise in position in the magazine by side wall 42 and front glass plate 43, Figs. 6 and 7. Fig. 7 shows how the entrance portion of magazine 34 between plates 42, 43 tapers at 44, 45, respectively, so that when the blanks reach the top of the magazine they are not only parallel but the ends are aligned.

The hopper 1 and disk 19 of conveyor 16 are driven by belt 7 and pulley 28 on shaft of motor 6.

The blanks having now been collected in parallel in the magazine in sufficient volume to supply the forming mechanism, it is now in order to describe the distributor mechanism by which the parallel disposed blanks are continuously taken from the magazine and delivered to the forming devices to be formed while being conveyed through the machine. I prefer to control the distributor by a pattern device comprising a belt so as to determine the group spacing. In other words, the distributor supplies groups of blanks to the forming mechanism which latter, after completion of forming while still in group relation, delivers them to be set on the tape in the same group relation except as slight variation both of group and individual spacing is obtained by tape control as will hereinafter be explained.

The distributor broadly comprises a peripherally toothed wheel which continuously picks up the blanks from the magazine and holds them in parallel spaced relation. The pattern mechanism such as the belt herein shown is synchronized with the distributor and functions to block certain of the distributor pick-up teeth at predetermined times so that it fails for a determined number of teeth to pick up blanks, hence forming the group spacing.

38 is the distributor comprising in substance a rotary disk of thickness equal to the length of the blanks with longitudinal evenly spaced peripheral carrying slots 51 into which the blanks fall from the magazine as the distributor moves upward. See Figs. 6 and 12. The distributor comprises two halves 47, 48, mounted on shaft 49, Fig. 9, and driven by gear 50, Fig. 1. The slots 51 extend into the body of the distributor as shown in Figs. 9 and 12 to provide space for plates 52 which slide in and out of slots 51 according to whether a slot 51 is to pick up a blank or not. If plates 52 are withdrawn to leave slot 51 open, the blanks in the magazine 34 fall into slot 51 as soon as it passes point 53 at the upper corner of block 37 (Fig. 6). On account of the high speed of the distributor the blanks in the magazine are in continual motion, so that in case the first slot should not pick up the lowest blank it will pick up one higher up, due to the multiplicity of chances and also to the weight of blanks stacked in magazine 34. Spring 36 tends to equalize the pressure of blanks on distributor 38, which might otherwise vary partly because of the uneven feed of blanks coming up through channel 33 and partly because of the uneven demand of the distributor as regulated by plates 52.

Distributor slots 51 are of practically the same depth as the diameter of the blanks so that when the blanks rest on the bottom of the slots they readily pass under the point 54 of plunger 39, which is adjusted through nut 55 to give just the proper clearance between it and the distributor. Should a blank be caught between the distributor and point 54, spring 56 will yield sufficiently to pass such blank without damaging the machine. Upon passing point 54 the blanks are held in the slots against centrifugal force by gravity and also by block 58 which closely fits the distributor periphery.

Closing of slots 51 to exclude blanks for group spacing is determined by the pattern belt 57, Figs. 3, 6, 10, comprising an endless tape turning on sprockets 60 and idlers 61, 62. Pattern belt 57 comprises a tape carrying wires attached thereto similar to gear teeth doubled on themselves and clinched. Sprocket 60 has the same circular pitch as distributor 38 and is geared to the latter through shaft 63, gears 64, 65, and shaft 49, Fig. 9. The projections on belt 57 meet the slots on the distributor 38, Fig. 6, and push plates 52 back into the distributor out of slots 51. Side flanges 66, 67 on sprockets 60 keep belt 57 in line with the distributor. Certain of the wire teeth on belt 57 are cut away as at 68, Figs. 10, 11, to prevent plates 52 being pushed inwardly out of slots 51 by belt projections. Thus where blank portions 68 come in belt 57, plates 52 remain in position to fill up slots 51, thereby preventing blanks from being picked up by the distributor as it passes magazine 34.

As shown at the bottom of Fig. 9 (front of the machine) the distributor rotates between back plate 42 and front plate 69. One of these plates, or preferably both as shown, carry circular guides or tracks 70 similar to teeth concentric with shaft 49, Figs. 6 and 9, and the plates 52 are similarly notched, so that if the plates are pushed in by the teeth on belt 57 the circular teeth 70 interlock with the teeth of plates 52 to hold them in during about the succeeding 180° of revolution, or until after the blank has been picked up from the magazine and carried under point 54 of plunger 39. If plates 52 are not pushed in by the teeth of belt 57, the teeth of plates 52 engage one or more of the other circular teeth 70 and are thereby held out during the picking up portion of the revolution. The circular tracks 70 could be extended beyond the point 72 to cover a greater arc but this is unnecessary as block 58 holds the blanks already on the distributor in position, and it is thereafter immaterial whether or not plates 52 remain in or out. At points 73 on cams 74, Figs. 6 and 9, the plates 52 are positively pushed out and thereafter momentarily free between the end of cams 74 and point 71 so as to allow the teeth on belt 57 to function. Pushing out of the plates 52 by cam points 73 also transfers the blanks from the distributor periphery to the peripheral toothed space 75 of primary die 76. See Fig. 6.

The primary die is shown in section in Figs. 14, 15, 22 as comprising two halves, each carrying die impressions according to the form to be rolled on one or both ends of the blank as shown in Figs. 15–18 by co-operating roller 86, Figs. 3, 23. The narrow neck 77 of slot 75, Fig. 13, is to hold the blank central in the slot. The wider portion 78 permits spreading of the blank under pressure. Projection 79 at the bottom of the slot. Figs. 12, 15, makes the impression 80 on the blank, Fig. 18, for gripping the tape.

Referring to Fig. 12, as cams 74 throw plates 52 of distributor 38 radially to successively discharge the blanks into slots 75 in primary die 76, the blanks slide in over the point of guide 82. This guide fits around the outside of a portion of primary die 76 to keep blanks from being dislodged from slots 75. The point of guide 82 extends into the peripheral groove 81 provided for it in distributor 38 and in plates 52, Fig. 9. As the blanks are carried along in die 76 guide 82 prevents them from falling out, endwise disengagement being prevented by end guides 83 which extend from point 84, Figs. 6 and 20, where the blanks leave the distributor to point 85, Fig. 20, where the blank is pressed into slots 75 by roller 86 to the form shown in Figs. 15–18. Roller 86 is is in effect an idler revolving in bearings 87 by frictional contact with the blanks carried by die 76. Roller 86 is adjusted by set screw 89 to exert the desired pressure on the blanks. See Figs. 3, 20 and 21.

Primary die 76 is mounted on shaft 90 and geared to distributor 38 by gears 91, 50, whose pitch corresponds with that of distributor 38 and die 76, so that a distributor slot 51 will always meet a die slot 75 on the diameter including the centers of distributor 38 and primary die 76. See Figs. 1, 6 and 20. Pressing of the blanks by roller 86 is generally sufficient to make the blanks adhere to the die, but as a precaution, a guide 92 insures that the blanks after pressing are not dislodged from their positions in die slots 75.

As shown in Fig. 14, the two halves of die 76 are held together on shaft 90 by nuts 93 with distance collar 94 between, so that changing the length of the distance collar moves the dies closer together or farther apart.

The primary die 76 can form the blanks into many different shapes other than those illustrated. As shown, recesses 95 are formed in the blanks by projection 79, but these may be omitted and the blank simply flattened. A compression between die 76 and roller 86 to flatten the blank with or without producing tape holding projections therein is desirable in order to make a thinner fastener member. Also, die 76 may serve no other purpose than as a conveyor for parallel disposed blanks from the distributor to points of subsequent forming operations. Also a flattening and forming operation on the blank in die 76 tends to prevent dislodgment and makes the blank easier to handle at the point of transfer into the next forming die.

The blanks impressed into slots 75 of die 76 travel with the die until they strike bender 96, comprising an idler running in bearings 97 (Figs. 20 and 22) mounted in adjustable block 98. This block is made in two halves in order to facilitate assembling of the bender and is fitted as a slide on two parallel sides of sleeve 99 movable within the space provided by hollow dies 76 (Figs. 14, 20, 22). Fastened between the two halves of block 98 is a sheet metal extension 100 (Figs. 14, 20) projecting through opening 101 between the two halves of die 76 (Fig. 14) and rigid with block 98 carrying bender 96, so that the position of bender 96 may be variously adjusted by extension plate 100 to the proper limitations.

Figure 1:
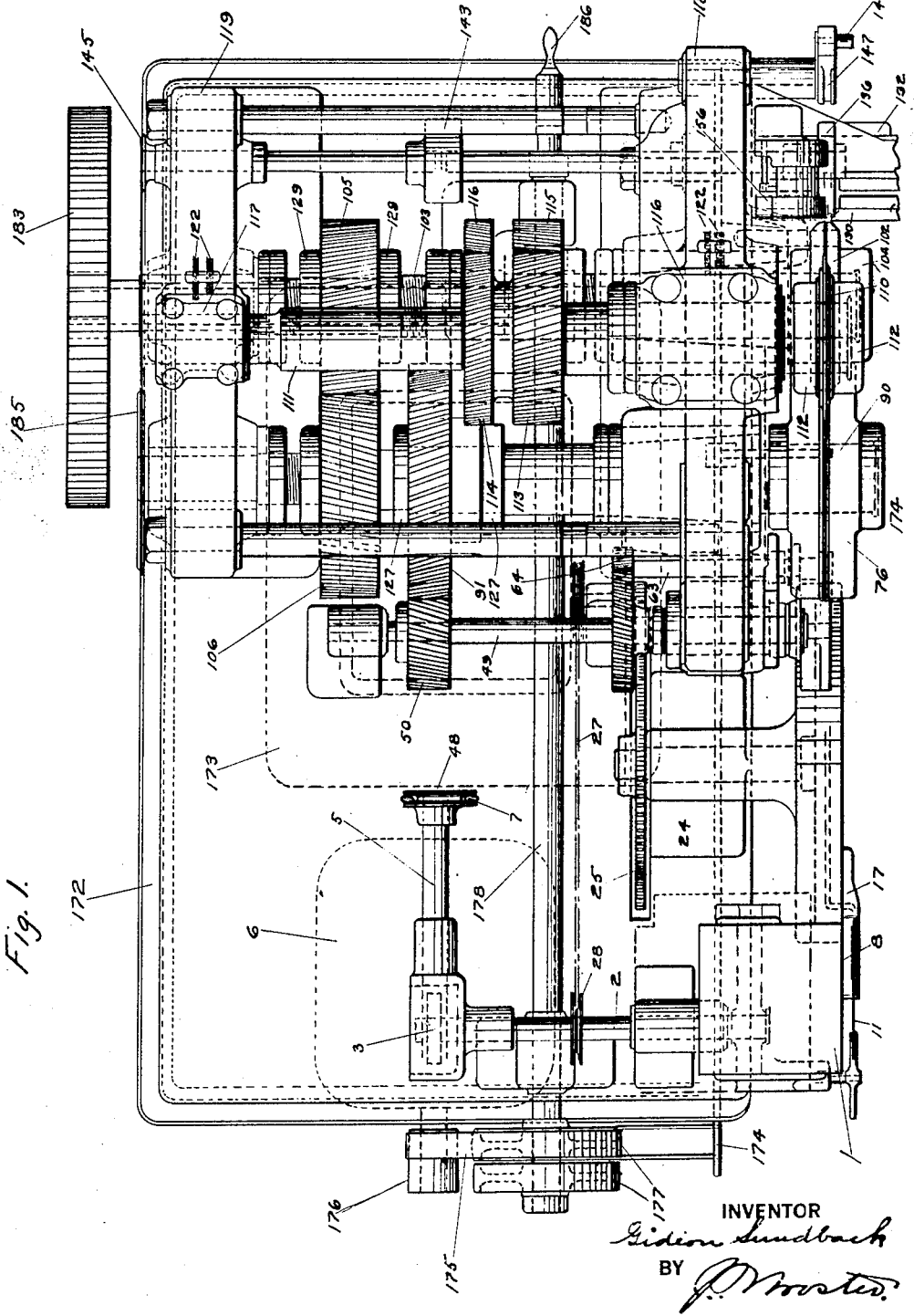
Fig. 1 is a top plan view of a machine embodying the invention.

The upper edge of extension plate 100 has a reinforcement 188 to which are attached adjusting screws 189, 190 (Fig. 20) by means of which bender 96 is slid up and down in the direction of the center lines running lengthwise through screw 189 and the center of die 76. The clamps 191 (Figs. 14 and 20) tighten on bar 192 by nuts 193,

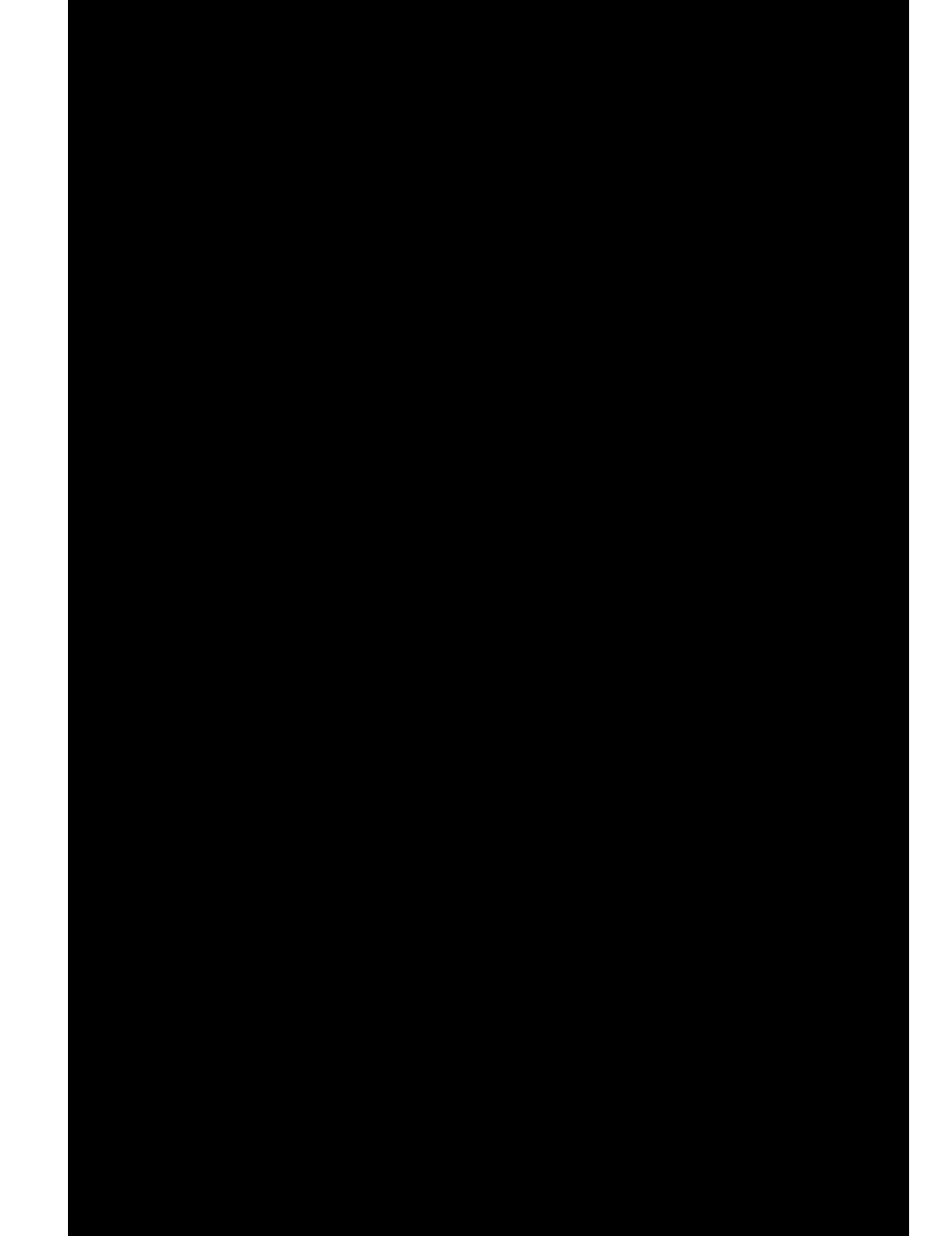

adjustment between distributor 38 and die 76, Fig. 1. Gear 64 meshing with gear 65 has nuts 128—Fig. 9, to provide angular adjustment between space chain 57 and distributor 38. Gear 105 meshing with gear 106 has nuts 129—Fig. 1, to accomplish the necessary adjustment between dies 102 and 76. It will be further noted that each two co-operating die elements are operated by a separate pair of gears so that adjustment between any two will not vary adjustment of others.

While the blanks are being completed and made into finished interlocking members by being pressed by punch 110 into impressions 107 in die 102, Fig. 26, they continue sliding under plates 109 and are thereby held in position until the blank ends, protruding beyond the periphery of die 102, Fig. 27, contact with side rolls 130, Figs. 25, 26, 28. Side rolls 130 are idlers mounted on studs 131 and are adjustable toward die 102 by nuts 132, and toward the tape by set screws 133 and 134. With this adjustment, the side rolls can be set in any desired position to accurately bend or compress the interlocking members on the tape. Flanges 135 on the side rolls, Fig. 34, insure a central bend of the interlocking members and also that the ends bend evenly.

Tape 139 having a corded edge 140 is fed down through tape guide 136 tangential to die 102, with the corded edge in a central position between the jaws of the interlocking members, the tape being pressed down into the members by the tape guide 136. The jaws of the interlocking members are thus clinched around the tape by being bent inwardly toward each other by side rolls 130. Tape guide 136 is adjustable in and out by set screw 137, and laterally by set screw 138. See Figs. 25, 26, and 34. It will be seen that several successive members will be in process of being compressed by the rolls 130 at once, constituting a continuous setting operation, as distinguished from the intermittent setting operations of my prior patents, wherein a full stop of both blank and tape at the moment of setting is necessary. In this machine the tape and interlocking members move continuously.

Spacing on the tape between interlocking members, is principally governed by the spacing of the die formations 107 in die 102. This is necessary because several of the interlocking members remain continuously in the die for a short interval after being pressed partly or wholly onto the tape. In this way, die 102 governs the tape feed by reason of its hold on the interlocking member fastened to the tape but still not disengaged from the die.

Feed of the tape is aided by the tape feed and tension mechanism of Figs. 31, 32 and 33. 141 is a tape roll with a knurled or rubber covered surface mounted on shaft 142 driven by friction clutch 143 through shaft 144 and sprocket 145. 146 is a band which offers very little friction to the tape having one end fixed at 150 and the other end fastened to drum 147. Drum 147 has a projecting handle 148. By moving handle 148 against the pressure of spring 149 into dotted position 151—Fig. 31—the band is held in dotted position 155, Fig. 31, away from contact with the roll. Locking of handle 148 is effected by pin 152 entering hole 153 in plate 154. The tape or stringer as it comes from tape guide 136 leads in between tape roll 141 and band 146. With pin 152 relieved spring 149 presses the band against the roll, with the tape of the stringer between. By reason of the friction on band 146, rotation of roll 141 carries the stringer with it, keeping it taut between the point where it contacts with the roll and the point where the interlocking members leave die 102.

Shaft 144 is driven at a slightly faster rate than necessary to keep tape roll 141 at the same speed with the fastener stringer as it is released by die 102, this difference being taken up by slipping of clutch 143 against the tension of the stringer due to die 102, except when the latter carries no interlocking members. Thus, when blank stretches of tape between groups of interlocking members pass the point of contact with die 102, the tape feed is governed by the speed of roll 141. The stringer is guided onto roll 141 by groove 156 into which the interlocking members nestle, Fig. 32. On the other side of the tape guide 136 is a tape tension comprising roll 156 with frictional periphery onto which the tape folds, roller 157 swinging on arm 158. Attached to roll 156 is a conical friction drum 159. Cone 160 mounted on shaft 161 and held against torsion by fork clamp 162 is adjusted in and out through set screw 163 and spring 164. The friction between the tape and roll 156 is greater than that between cones 159 and 160 so that the slipping is always in the cone. In this manner set screw 163 regulates the tape friction.

By the tension arrangement described, Fig. 31, and the tension of clutch 143, Fig. 33, adjustable by spanner nut 165, the spacing between interlocking members may be changed to some extent. For example, if the exact spacing of die 102 is desirable, the tension produced by cone 160 in Fig. 31 is released so that the tape will come over roll 156 with a very slight pull, nut 165 being adjusted so as to barely make clutch 143 pull the tape down against the tension of roll 156. The spacing is increased somewhat by leaving the upper tension loose and tightening clutch 143 so that the tape pulls hard against the drag produced on the tape by die 102 carrying the interlocking members clinched to the tape or in process of being clinched on. This makes the tape slip through the interlocking members and increases the spacing. This slip may be materially increased by reducing the pressure of side rolls 130 on the jaws of the interlocking members so that the members are only loosely and slidably clinched on the tape. In this instance the members are finally set by sending the stringer through flat rolls. The spacing may be decreased by tightening the tension on roll 156 as well as the clutch 143 to keep the tape taut while the interlocking members are pressed on. The tape when released contracts somewhat, making the spacing between the members proportionately smaller. The tape is fed from spool 170, Fig. 31, and the stringer rolls from drum 147 through chute 171 into a box or other receptacle.

It will be seen that after the blanks have been centralized in parallel relation in the magazine 34 by the edges 44, 45, they are kept travelling through the machine in parallel. The dies all rotate in the same plane and are adjustable within limits therein.

Figure 2:
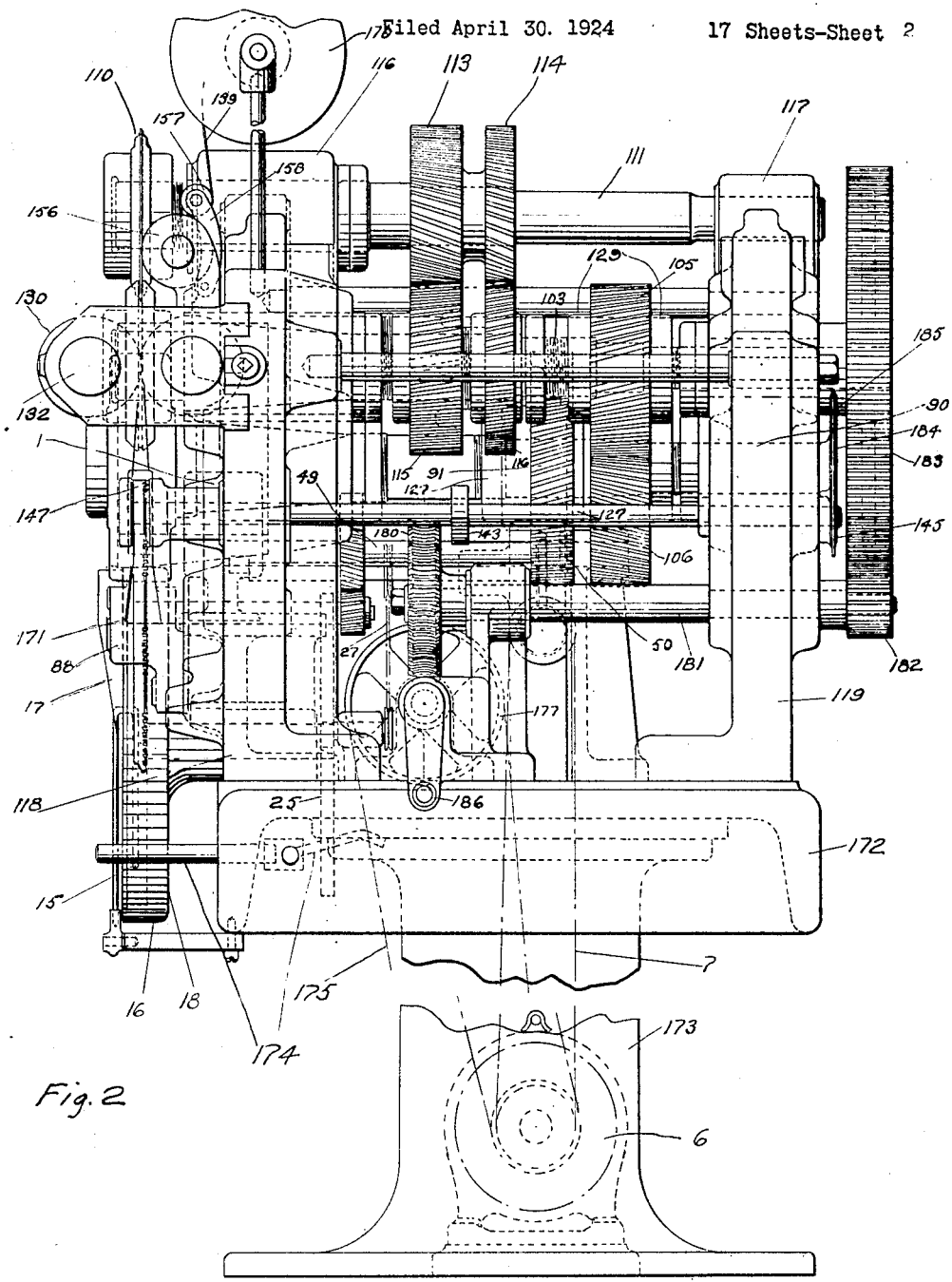
Fig. 2 is an end view, seen from the right of Fig. 1.

After the motor 6 is started the machine is set in motion by belt shift 174 through belt 175 which runs from the pulley on one end of the motor shaft 176 over the tight and loose pulleys on shaft 178. By this arrangement the hopper and conveyor operate upon starting the motor to charge magazine 34. As soon as the latter is charged to overflowing, the belt shifter is pushed over to start the main part of the machine. The machine is driven through the shaft 178, worm 179, worm gear 180, Figs. 2 and 3, shaft 181, pinion 182, gear 183 mounted on shaft 103, which latter drives the remainder of the machine. Sprocket 145 which drives the tape feed is itself driven by chain 184 from sprocket 185 on shaft 90. 186 is a hand crank on shaft 178 by which the machine can be turned over by hand.

The forms of interlocking surfaces which may be produced by this machine are so variable as to be only capable of illustration herein by way of example, and the invention is not confined to a machine for making this particular form, since by changing slots 75, and die 76, and forms 107 in die 102, and the forms on punch 110, the size and form of interlocking members may be widely varied. A form well adapted for fastener purposes is shown in Figs. 35–38, and a portion of completed fastener on an enlarged scale in Fig. 39.

The present method specifically comprises cutting off, tumbling, flattening, bending, scooping or forming interlocking surfaces, and setting, with an additional step of brushing or finishing to remove machine tool marks if desired. One variation of this specific method and intended to be within the scope of the accompanying claims is in order: flattening, cutting, bending, forming interlocking surfaces, setting and buffing. Another method would be flattening, cutting off, bending, forming interlocking surfaces, setting and brushing. Still another method would be flattening, forming interlocking surfaces, cutting off, bending, setting and brushing. Another method would be cutting off, tumbling, bending, forming interlocking surfaces and setting. Another method would be flattening, cutting off, tumbling, bending, forming interlocking surfaces, and setting. The method can also be carried out by more than one machine, as for instance, one machine could perform the cutting, flattening and tumbling or brushing, and a second machine could do the bending, forming interlocking surfaces, setting, and final brushing.

It will furthermore be observed that by reason of the rolling operations, a plurality of blanks are being continuously worked on at a time during the various flattening, bending, forming and setting operations, in conjunction with continuous tape feed, thus doing away with intermittent or irregular strip or blank and tape feed, and enabling very high production capacity to be obtained.

The novel forms of interlocking members disclosed are not claimed herein but will be claimed in one or more separate applications. As I believe I am the first to produce a machine of this character wherein previously cut blanks are continuously formed into interlocking jaw members and set on a continuously moving tape, I intend to claim the several combinations and sub-combinations broadly, and do not restrict myself to the particular details shown except as required by the appended claims.

I claim:

1. Method of making an interlocking fastener member comprising cutting a blank, bending to U shape, and forming interlocking surfaces at the bend.

2. Method of making an interlocking fastener member comprising cutting wire blanks, tumbling, bending to U shape, and forming interlocking surfaces at the bend.

3. Method of making an interlocking fastener member comprising cutting a blank from straight plain wire, arranging said blanks in parallel, and feeding said blanks in close succession through rotary forming devices to form and bend said blanks into U shaped jaw members having interlocking surfaces at the bends and tape engaging projections on the legs.

4. Method of making an interlocking fastener member comprising forming a blank of predetermined length into a U shaped jaw member having engaging indentations on the inner surfaces of the legs and interlocking surfaces at the bend.

5. Method of making an interlocking fastener member comprising cutting a straight blank, removing burs from the ends thereof, and forming same into a U shaped jaw member having engaging indentations on the inner surfaces of the legs and interlocking surfaces at the bend.

6. Method of making an interlocking fastener member comprising cutting a blank from wire, shaping the ends to form engaging surfaces, bending to U shape, and forming interlocking surfaces at the bend.

7. Method of making an interlocking fastener member comprising cutting a blank from wire, shaping the ends to form engaging surfaces, bending to U shape, and rolling interlocking surfaces at the bend.

8. Method of making an interlocking fastener member comprising pressing a blank of predetermined length to form engaging projections adjacent each end, bending the blank to U shape, and pressing the bend of the blank to form interlocking engaging surfaces.

9. Method of forming an interlocking fastener member comprising forming plain blanks, and rolling same while feeding to form U shaped members having tape engaging projections at the inner ends of the legs and interlocking projections at the bends.

10. Method of making a fastener stringer comprising forming blanks of predetermined length into U shaped jaw members having engaging projections on the inner surfaces of the legs and interlocking surfaces at the bends, supplying a tape, and successively compressing said members on the tape.

11. Method of making a fastener stringer comprising rolling blanks of predetermined length into U shaped jaw members having engaging projections on the inner surfaces of the legs and interlocking surfaces at the bend, supplying a tape, and successively compressing said members on the tape by rolling.

12. Method of making a fastener stringer comprising pressing blanks of predetermined length to form engaging projections adjacent each end, bending the blanks to U shape, pressing the bends of the blanks to form interlocking surfaces, supplying a tape, and compressing said formed blanks on the tape.

13. The method of making fastener stringers comprising accurately spacing and laterally bending a plurality of fastener member blanks and clamping same to a tape while in motion and while maintaining said accurate spacing.

14. Method of making a fastener stringer by rolling operations comprising stacking blanks in parallel, charging a rotary distributor therewith in parallel relation, successively discharging them in parallel to a rotary carrying die, partially forming the blanks while being carried by said die, discharging the blanks to a second rotary carrying die, passing said blanks under a bending roll to bend them to U shape, rolling interlocking projections at the bends, and passing the formed blanks simultaneously with a tape between rolls to set the blanks thereon.

15. Method of making a fastener stringer by rolling operations comprising stacking previously cut blanks in parallel in a magazine, charging a rotary distributor therewith in parallel relation, discharging them to a rotary rolling die mechanism to form tape engaging surfaces, to bend to U shape and to form interlocking projections at the bends, and passing the formed blanks simultaneously with a tape between rolls to set the blanks thereon.

16. In the manufacture of fastener stringers comprising a tape having spaced interlocking members affixed thereto, the method which consists in feeding a taut tape, conveying to said tape the formed members in spaced position to be pressed on the tape, and successively pressing said members on the tape.

17. In the manufacture of fastener stringers comprising a tape having spaced interlocking members affixed thereto, the method which consists in feeding a taut tape, conveying to said tape the formed members in spaced position to be pressed on the tape, and successively pressing said members on the tape while both are moving at the same speed.

18. In the manufacture of fastener stringers comprising a tape having spaced interlocking members affixed thereto, the method which consists in feeding a taut tape, conveying to said tape the formed members in spaced position to be pressed on the tape, varying such spacing by varying the tape tension, and successively pressing said members on the tape.

19. The combination of means for feeding a blank, means to impress holding portions at the ends of the blank, means for bending the blank to U shape while feeding the same, means for impressing interlocking surfaces at the bend of the blank, and means for discharging the blank.

20. The combination of means for feeding a blank, means to impress holding portions at the ends of the blank, means for bending the blank to U shape, means for impressing interlocking surfaces at the bend of the blank while feeding the same, means for supplying a tape, and means for compressing the formed blank thereon.

21. The combination with traveling die mechanism for receiving, carrying and forming blanks in succession to continuously produce U shaped jaw members having holding portions at their ends and interlocking surfaces at their bends, of means continuously supplying tape, and means continuously compressing the formed members on the tape as supplied by the die mechanism.

22. The combination with traveling die mechanism receiving blanks in succession at one point and while carrying the blanks forming same into bent U shaped jaw members with holding portions at the ends and interlocking surfaces at the bends, of a continuously moving tape receiving the formed blanks on one edge from said die mechanism, and means continuously compressing the blanks on the tape during travel thereof.

23. The combination with rotary die mechanism receiving blanks in succession at one point and while carrying the blanks forming same into bent U shaped jaw members with holding portions at the ends and interlocking surfaces at the bends, of a continuously moving tape receiving the formed blanks on one edge from said die mechanism, and means continuously rolling the blanks on the tape during travel thereof.

24. The combination with a rotary recessed die for receiving blanks, of cooperating means for impressing the blank ends with tape holding projections, a rotary forming die adjacent the discharge side of said first die, means for transferring the blank from the first to the forming die, means for bending it to U shape therein, and means for forming interlocking surfaces at the bends of the blanks while being carried by said forming die.

25. The combination with a rotary recessed die for receiving blanks, of cooperating means for impressing the blank ends with tape holding projections, a rotary forming die adjacent the discharged side of said first die, a single means for transferring the blank from the first to the forming die and bending it to U shape therein, and means for forming interlocking surfaces at the bends of the blanks while being carried by said forming die.

26. The combination with a rotary peripherally recessed die for receiving blanks, of a cooperating roll for impressing the blank ends with tape holding projections, a second die peripherally recessed for receiving the blanks from the first die, means for transferring the blanks to the recesses of the second die including a cooperating roll for bending the blanks to U shape in the recesses of the second die, and a cooperating roll die for forming interlocking surfaces at the bends of the blanks while being carried by said second die.

27. The combination with means for holding parallel stacked blanks, of a distributor for taking blanks one by one in parallel relation, a rotary peripherally recessed die receiving the blanks from the distributor, means cooperating with the die to impress holding portions at the ends of the blank, means for bending the blank to U shape, means for impressing interlocking surfaces at the bend of the blank, and means for discharging the blank.

28. The combination with a rotary carrier having peripheral blank carrying recesses, of a bending roll partly within said carrier, and an adjacent cooperating peripherally recessed rotary die for receiving the blanks and holding them during bending by said bending roll.

29. The combination with a rotary carrier having peripheral blank carrying recesses, of a bending roll partly within said carrier, an adjacent cooperating peripherally recessed rotary die for receiving the blanks and holding them during bending by said bending roll, and a cooperating die for forming interlocking surfaces on the bends of the blanks.

30. The combination with a rotary carrier having peripheral blank carrying recesses, of a bending roll partly within said carrier, an adjacent cooperating peripherally recessed rotary die for receiving the blanks and holding them during bending by said bending roll, and means for adjusting the bending roll relatively to the carrier.

31. The combination with a rotary carrier comprising spaced peripherally recessed disks, of means for feeding blanks thereto, a rotary die receiving blanks therefrom after a partial revolution, a supporting plate carried by the frame extending between said carrier disks, and a bending roll supported by said plate between said disks and having its periphery projecting adjacent said rotary die for bending the blanks thereinto as taken from the carrier.

32. The combination with a rotary carrier comprising spaced peripherally recessed disks, of means for feeding blanks thereto, a rotary die receiving blanks therefrom after a partial revolution, a supporting plate carried by the frame extending between said carrier disks, a bending roll supported by said plate between said disks and having its periphery projecting adjacent said rotary die for bending the blanks thereinto as taken from the carrier, and means for adjusting the plate on the frame in transverse directions to adjust the bending roll relatively to said carrier and die.

33. The combination with a movable die in which blank members are deformed to provide interlocking surfaces, of means for feeding the blanks to the die, and means for engaging the blanks and a tape and rolling the blanks thereon.

34. The combination with a rotary die in which blank members are rolled during travel of the die to provide interlocking surfaces, of means for supplying a tape, and means for rolling the blanks thereon during further travel of the die.

35. The combination with a rotary distributor having peripheral blank carrying recesses, of a rotary forming die having peripheral blank recesses adjacent thereto and receiving blanks therefrom, a roller for forming blanks while being carried by said die, a second die having peripheral blank carrying recesses and a bending groove, a bending roll for bending the blanks into the groove in the latter die as transferred from the first die and while held in the recesses of the second die, a roller for forming interlocking surfaces on the bent blanks in the second die, a continuously feeding tape tangent to the second die, and means compressing the blanks on the tape as the tape and second die contact.

36. The combination with a continuously moving distributor for successively receiving and carrying blanks substantially within the distributor and at spaced intervals, of means preventing feed of blanks by said distributor at predetermined times.

37. The combination with a distributor having recesses for successively receiving and carrying blanks at spaced intervals, of means for filling some of said recesses and preventing a predetermined number of said recesses at predetermined times from receiving blanks.

38. The combination with a rotary peripherally recessed distributor, and means for supplying blanks to be carried thereby, of means blocking certain of said distributor recesses at predetermined times.

39. The combination with a distributor for successively receiving and carrying blanks at spaced intervals, of a die traveling with the distributor, means discharging blanks from the distributor to the die, and means cooperating with the die for forming the blanks.

40. The combination with a distributor for successively receiving and carrying blanks at spaced intervals, of a die traveling with the distributor, means discharging blanks from the distributor to the die, means cooperating with the die for forming the blanks into U shape and setting them on a tape, and tape feeding means.

41. The combination with a magazine for holding stacked parallel blanks, of a recessed moving distributor contacting with the blanks in the magazine and taking them one by one therefrom, a traveling die receiving blanks from the distributor, and means for discharging blanks from the distributor to the die.

42. The combination with a magazine for holding stacked parallel blanks, of a recessed moving distributor contacting with the blanks in the magazine and taking them one by one therefrom, pattern means for excluding blanks from certain of the distributor recesses, a traveling die receiving blanks from the distributor, and means for discharging blanks from the distributor to the die.

43. The combination with a rotary peripherally recessed blank carrying distributor, of recess controlling devices movable therewith and independently radially to open and close the recesses, and means for moving said controlling devices radially to control said recesses.

44. The combination with a rotary peripherally recessed blank carrying distributor, of recess controlling devices movable therewith and independently radially to open and close the recesses, means for holding said controlling devices against radial movement during a portion of the revolution, and means for moving said controlling devices radially to control said recesses.

45. The combination with a rotary peripherally notched blank carrying distributor, of a radially movable plate for controlling each recess to open or close same, a circular track for holding said plates against movement during a portion of the revolution, and means for actuating said plates at another point to discharge blanks carried in the recesses.

46. The combination with a rotary peripherally notched blank carrying distributor, of a radially movable plate for controlling each recess to open or close same, a circular track for holding said plates against movement during a portion of the revolution, means for actuating said plates at another point to discharge blanks carried in the recesses, and a pattern device for controlling said plates to determine which recesses shall carry blanks.

47. The combination with a rotary peripherally notched blank carrying distributor, of a radially movable plate for controlling each recess to open or close same, a circular track for holding said plates against movement during a portion of the revolution, means for actuating said plates at another point to discharge blanks carried in the recesses, and a belt having pattern teeth peripherally engaging said distributor for controlling said plates to determine which recesses shall carry blanks.

48. The combination with means for periodically supplying groups of spaced blanks, of means receiving such groups and maintaining the spacing, means cooperating with said receiving means for forming the blanks into U shaped members with tape engaging projections on the legs, tape supplying means, and means setting the formed members on the tape as spaced.

49. The combination with means for periodically supplying groups of spaced blanks, of rotary die mechanism receiving such groups and maintaining the spacing, means cooperating with said rotary die mechanism for forming the blanks into U shaped members with tape engaging projections on the legs, tape supplying means, and rolls setting the formed members on the tape as spaced.

50. The combination of means for supplying blanks, means for feeding the blanks in spaced relation in groups, rotary forming die mechanism receiving the spaced blanks and forming them into compressible jaw members, means for supplying a tape, and means for compressing the members on the tape in such spaced and group relation.

51. The combination with a rotary bending die, of means for supplying blanks thereto, a bending roll for bending the blanks into the die, and means for discharging bent blanks from the die.

52. The combination with a rotary bending die, of means for supplying blanks thereto, a bending roll for bending the blanks into the die, tape feeding means, and means for compressing the blanks onto the tape.

53. The combination with a rotary bending die, of means for supplying blanks thereto, a bending roll for bending the blanks into the die, tape feeding means, and rolls for compressing the blanks onto the tape.

54. The combination with a rotary bending die, of means for supplying blanks thereto, a bending roll for bending the blanks into the die, a cooperating roll die for forming the blank bends, tape feeding means, and means for compressing the blanks onto the tape.

55. The combination with a rotary peripherally recessed bending and bend shaping die, of means for supplying blanks to the blank recesses, a roll for bending blanks into the recesses, a second rotary die for shaping the bends into final form, tape feeding means, and means for rolling the formed members on the tape.

56. The combination with a rotary peripherally notched blank carrying means, of a peripherally grooved bending die adjacent thereto having blank receiving recesses, and a bending roll within said blank carrying means cooperating with said die to bend the blanks into the recesses thereof as the blanks are transferred.

57. The combination with rotary peripherally notched blank carrying means, of a peripherally grooved bending die adjacent thereto having blank receiving recesses, a bending roll within said blank carrying means cooperating with said die to bend the blanks into the recesses thereof as the blanks are transferred, and a second die cooperating to shape the blank bends in the first die.

58. The combination with rotary peripherally notched blank carrying means, of a peripherally grooved bending die adjacent thereto having blank receiving recesses, a bending roll within said blank carrying means cooperating with said die to bend the blanks into the recesses thereof as the blanks are transferred, tape feeding means, and means for compressing the blanks onto the tape.

59. The combination with rotary peripherally notched blank carrying means, of a peripherally grooved bending die adjacent thereto having blank receiving recesses, a bending roll within said blank carrying means cooperating with said die to bend the blanks into the recesses thereof as the blanks are transferred, a second die cooperating to shape the blank bends in the first die, tape feeding means, and means for compressing the blanks onto the tape.

60. The combination with a rotary peripherally notched die, of means for supplying blanks thereto, a roll for indenting the blank ends, a peripherally grooved bending die adjacent thereto having blank receiving recesses, and a bending roll within said first die cooperating with said second die to bend the blanks into the recesses thereof as the blanks are transferred.

61. The combination with a rotary peripherally notched die, of means for supplying blanks thereto, a roll for indenting the blank ends, a peripherally grooved bending die adjacent thereto having blank receiving recesses, and a bending roll within said first die cooperating with said second die to transfer and bend the blanks into the recesses thereof.

62. The combination with rotary peripherally notched blank carrying means, of a peripherally grooved bending die adjacent thereto having blank receiving recesses, and a bending roll within said blank carrying means cooperating with said die to transfer and bend the blanks into the recesses thereof.

63. The combination with rotary peripherally notched blank carrying means, of a peripherally grooved bending die adjacent thereto having blank receiving recesses, a bending roll within said blank carrying means cooperating with said die to transfer and bend the blanks into the recesses thereof, and a rolling die for forming interlocking surfaces on the blank bends.

64. The combination with a hopper for receiving blanks, of a receptacle receiving the blanks from the hopper, means for controlling the rate of discharge from the hopper, a conveyor for picking up blanks one by one in the receptacle, a magazine, and means for discharging blanks from the conveyor to the magazine.

65. The combination with a receptacle for receiving loose wire blanks, of a disk carrying projecting parallel pins rotating therein to pick up blanks, said pins having blank receiving recesses, means for returning improperly picked up blanks to the receptacle, a magazine, and means for discharging blanks from the pins to the magazine in parallel relation.

66. The combination with a receptacle for receiving loose wire blanks, of a disk carrying projecting parallel pins rotating therein to pick up blanks, said pins having blank receving recesses, means for returning improperly picked up blanks to the receptacle, a magazine, means for discharging blanks from the pins to the magazine in parallel relation, and means discharging overflow from the magazine to the receptacle.

67. The combination with a hopper for receiving blanks, of a receptacle receiving the blanks from the hopper, means for controlling the rate of discharge from the hopper by the quantity in the receptacle, a conveyor for picking up blanks one by one in the receptacle, a magazine, and means for discharging blanks from the conveyor to the magazine.

68. The combination with a rotary conveyor comprising parallel blank carrying pins, of a stripper disposed tangentially of the path of the pins to strip blanks therefrom and positioned relatively to the pins to prevent blanks from falling back, and a magazine receiving the blanks from the stripper.

69. The combination with a shaking blank hopper, of a movable discharge door, a receptacle receiving the blanks from said hopper, means for controlling said door to maintain a constant level of blanks in the receptacle, a conveyor for taking blanks in parallel relation therefrom, a magazine, and means for stripping the blanks from the conveyor and guiding them in parallel into the magazine.

70. The combination with a receptacle holding cut blanks, of a traveling conveying device therein for picking up blanks, means for dislodging therefrom picked up blanks in other than a predetermined position, and means for stripping and stacking the picked up blanks.

71. The combination with a receptacle holding cut blanks, of a traveling conveying device therein for picking up blanks, means comprising projecting springs for dislodging therefrom picked up blanks in other than a predetermined position, and means for stripping and stacking the picked up blanks.

72. The combination with a receptacle holding cut blanks, of a traveling conveying device comprising a disk carrying pins projecting therein for picking up blanks, means for dislodging therefrom picked up blanks in other than a predetermined position, and means for stripping and stacking the picked up blanks.

73. In a machine for making fastener members, means for alining a plurality of fastener member blanks in a work holder, a deforming tool, and means for moving said deforming tool along the line of fastener member blanks and successively deforming each.

74. In a machine for making fastener members, means for supporting a plurality of fastener member blanks in substantially the relative positions which they are to occupy on the finished fastener, a deforming tool, and means for moving said deforming tool into successive engagement with said blanks.

75. In a machine for making fastener members, means for conveying a plurality of fastener member blanks in substantially the relative positions which they are to occupy on the finished fastener, a tape feeding mechanism, and means for laterally bending said fastener member blanks and for clamping them to the tape while in motion.

76. In a machine for making fastener members, a workholder, means for alining a plurality of fastener member blanks in said workholder, a deforming tool, means for moving said deforming tool along the line of fastener member blanks to deform said blanks, and means for varying the relative position of said deforming tool and said work-holder to control the shape of said fastener members.

77. The method of forming a separable fastener locking member which comprises deforming a piece of strip material to provide an interlocking portion and a pair of clamping jaws, and deforming said jaws to cause an unequal compression of the tape held between said jaws.

78. The combination with a receptacle for receiving loose blanks, of a magazine, means for conveying blanks from said receptacle and accumulating them in uniform relation in said magazine, and means for conveying said blanks one by one from said magazine.

79. The combination with a receptacle for receiving loose blanks, of a conveyor for picking up blanks one by one in said receptacle, a magazine for storing blanks, means for discharging blanks from the conveyor to the magazine in uniform relation, and means for conveying said blanks one by one from said magazine.

80. The combination with a receptacle for receiving the loose blanks, of a conveyor for picking up blanks in the receptacle, a magazine for storing blanks, means for discharging blanks from the conveyor to the magazine in uniform relation, and a moving distributor having means for taking said blanks one by one from said magazine.

81. The combination with a receptacle for receiving loose wire blanks, of a conveyor for picking up blanks in the receptacle, a magazine, means for discharging blanks from the conveyor to the magazine in parallel relation, and a moving distributor contacting with the blanks in the magazine and having means for taking them one by one therefrom.

82. The combination with a receptacle for receiving loose elongated blanks, of means carrying recessed blank picking-up means rotating therein to pick up blanks successively in parallel, a magazine, means for discharging blanks from said picking-up means to the magazine in parallel, and a moving distributor contacting with the blanks in the magazine and having means for taking them one by one therefrom.

Signed at Meadville, in the county of Crawford and State of Pennsylvania this 19th day of April, A. D. 1924.

GIDEON SUNDBACK.